United States Patent [19]
Goolcharan et al.

[11] Patent Number: 6,064,422
[45] Date of Patent: May 16, 2000

[54] TELECOMMUNICATION SYSTEM FOR BROADCAST QUALITY VIDEO TRANSMISSION

[75] Inventors: Boysie Goolcharan, Houston, Tex.; Tissa R. Karunasiri, Van Nuys, Calif.

[73] Assignee: The Goolcharan Charitable Trust, Houston, Tex.

[21] Appl. No.: 08/844,643

[22] Filed: Apr. 21, 1997

Related U.S. Application Data

[60] Provisional application No. 60/016,458, Apr. 29, 1996.

[51] Int. Cl.[7] ...................................................... H04N 7/14
[52] U.S. Cl. ................................ 348/17; 348/12; 348/13; 455/5.1
[58] Field of Search ................................ 348/7, 12, 13, 348/17; 455/5.1; 333/4, 5, 101, 25

[56] References Cited

U.S. PATENT DOCUMENTS

| | | |
|---|---|---|
| 4,399,439 | 8/1983 | Upadhayayula .................... 340/825.91 |
| 4,766,402 | 8/1988 | Crane .......................................... 333/25 |
| 5,283,637 | 2/1994 | Goolcharan . |
| 5,420,551 | 5/1995 | Conte et al. ................................ 333/12 |
| 5,742,213 | 4/1998 | Reynolds ................................. 333/131 |
| 5,995,505 | 11/1999 | Nakasaka ................................. 370/360 |

FOREIGN PATENT DOCUMENTS

WO 95/11570  10/1994  WIPO .

*Primary Examiner*—Andrew I. Faile
*Assistant Examiner*—Kieu-Oanh Bui
*Attorney, Agent, or Firm*—Charles H. Thomas

[57] ABSTRACT

A communication system is provided which allows video and audio/video transmissions over unloaded, twisted pairs of telephone wires. The system provides for automatic compensation of attenuation of a broadband video signal by measuring the attenuation of the low frequency components of the signal to determine the length of the unloaded, twisted pair through which the signal has been transmitted. This calculation is performed by comparing the attunated signal with the known signal level of transmission. Based upon the calculated length, the signal is amplified nonlinearly, since a greater loss occurs in the high frequency portions of a broadband signal than in the low frequency portions in transmission over twisted pairs of telephone wires. The signal is thereupon reconstructed. Also, the system allows transmission of a broadband frequency spectrum much wider than has heretofore been obtained. A broadband signal of at least 10.7 MHz can be transmitted over the system. The system also provides for left and right audio inputs and outputs, as well as auxiliary inputs and outputs. The transmission system can be utilized so that persons with a video camera and a personal computer can communicate with each other, transmitting full-motion, color video over unloaded, twisted pairs of telephone wires.

3 Claims, 36 Drawing Sheets

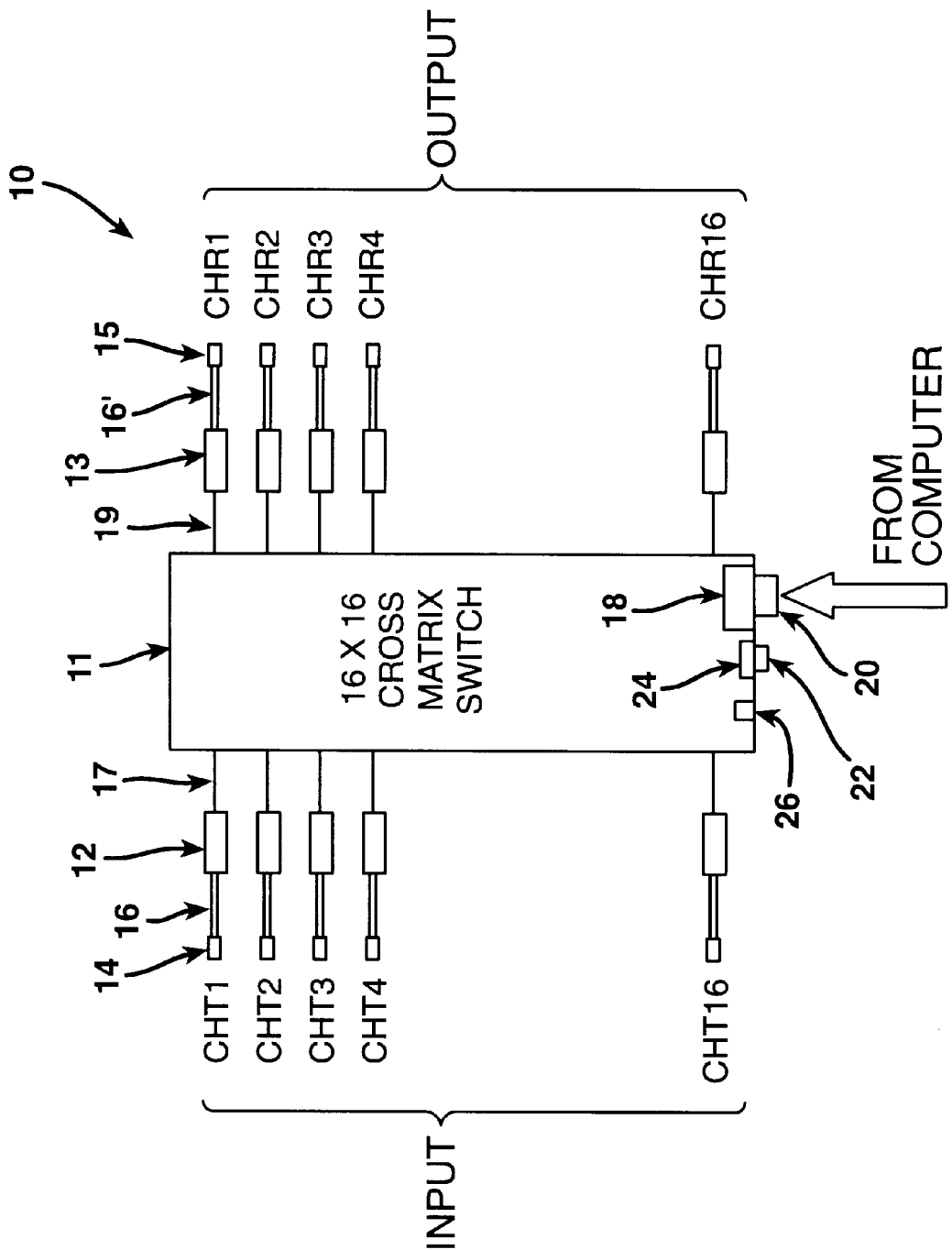

EXTENDING VIDEOCONFERENCING ROOM FACILITIES TO THE DESKTOP

FIG. 17
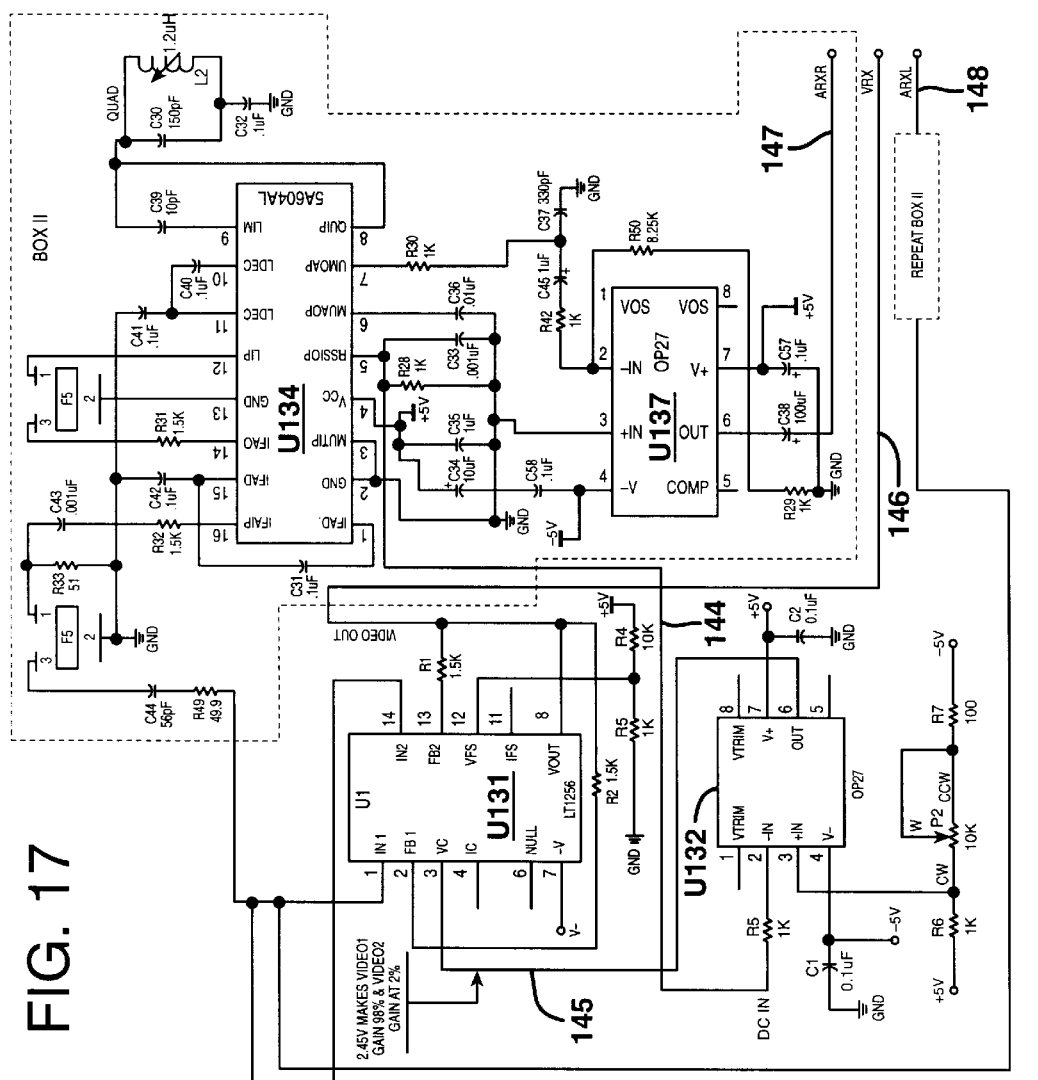
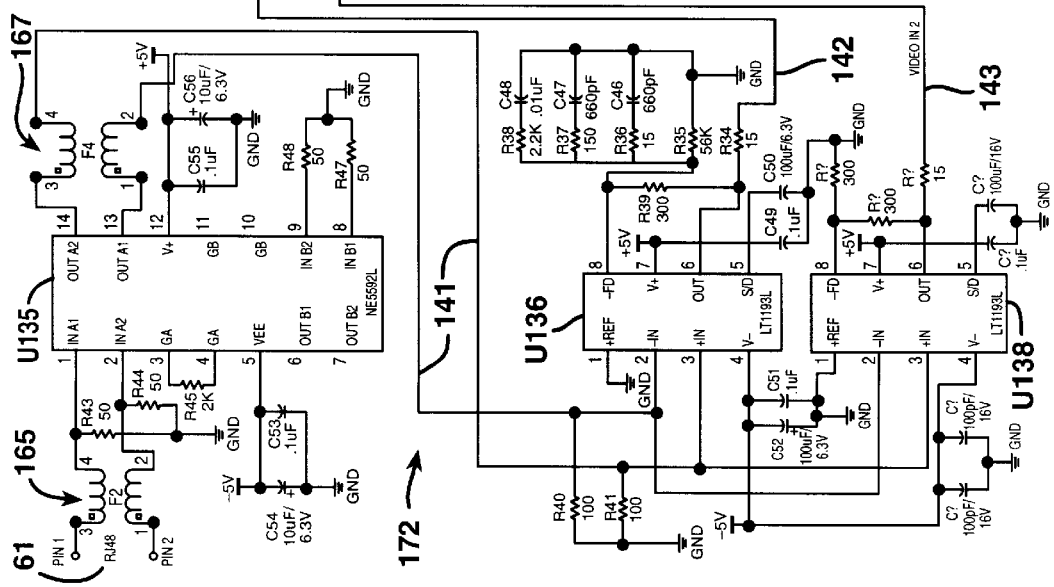

TELECOMMUNICATION SYSTEM FOR BROADCAST QUALITY VIDEO TRANSMISSION

This application claims the benefit of U.S. Provisional Application Ser. No. 60/016,458, filed Apr. 29, 1996.

BACKGROUND OF THE INVENTION

1. Field of the Invention

The present invention is directed to a telecommunication system for transmitting video signals, including the audio component and other services such as telephone, data, facsimile, and even video signals of broadcast quality, over twisted pairs of telephone wires and using a personal computer system or TV/HDTV monitor.

2. Description of the Prior Art

For many years transmission of full motion video images was possible only over communication links especially adapted for broad band frequency transmission, as contrasted with the bandwidth of communication signals employed in the transmission of audio or data telephone communications. Such high-grade video communication links were considered to be necessary since a video signal deteriorates rapidly and unevenly across its frequency spectrum with increasing length of the communication link. A telephone communication infrastructure employing twisted pairs of wire for carrying communication signals has existed in this and virtually every other country of the world for many years. However, this conventional telephone infrastructure could not be used for the transmission of full motion video signals because of the degradation of those signals in passing over the twisted pairs of telephone lines.

A significant advance was achieved when a system was devised for compensating for the degradation of the video signal over a twisted pair of telephone wires by introducing an impedance of equal and vectorially opposite direction into the received signal. This signal treatment essentially reconstructs the signal to its original quality after transmitting it along a twisted pair of telephone wires. This new system allows full motion, color video to be transmitted for full duplex over conventional pairs of twisted telephone wires and is described in U.S. Pat. No. 5,283,637.

The feature of signal reconstruction or automatic compensation lends itself to use with existing telephone infrastructures. For example, a central office typically services an area from the central off hub to the most remote service location an average distance of 4.5 miles over twisted pairs of telephone wires. Typically, these twisted pairs do not extend over lengths greater than 6,000 feet before passing through manholes. Also, central offices are connected to each other by twisted pairs of telephone wires which likewise pass through manholes.

At each central office and manhole location interconnections exist in the existing telephone infrastructure that allow the automatic compensation circuitry of the invention to be inserted in both the subscriber line and in lines between central offices. By employing automatic compensation as described herein a bandwidth of 20 MHz can be maintained from the central office hub to the end user, which is at the subscriber location. This capability allows the broadband signal to be transmitted while meeting the demands of video conferencing, remote meter reading, and even the monitoring of hospitalized patients for vital signs using live video, as well as the transmission requirements of conventional telephone services.

According to the system of U.S. Pat. No. 5,283,637, the length of the twisted pair of telephone wires was determined and compensating resistors and capacitors were strapped into the circuit, on a permanent, or at least semipermanent basis, so as to provide an impedance proportional and in opposition to the known impedance of the twisted pair link. This impedance, impressed on a video signal, thereby negates effects of the known impedance on the broad band video signal from the video source. The resistors and capacitors which were strapped into the circuit were determined by the length of the twisted pair link. Different resistive-capacitive networks would be strapped into the system depending upon the length of the twisted pair, and compensation could be achieved for segments of unloaded twisted pairs of telephone wires up to six thousand feet in length or greater, depending upon the gauge of the wire employed, without amplification. When amplifiers are added to the end of a 6,000 foot segment, greater distances can be achieved.

SUMMARY OF THE INVENTION

The present invention builds upon and substantially improves the basic system disclosed in U.S. Pat. No. 5,283,637. Utilizing the preferred embodiments of systems described herein, full motion, color video can be transmitted on a simplex basis up to at least 12,000 feet and duplex between 6,000 feet and 12,000 feet, depending upon the gauge of the wire.

One important aspect of the present invention provides a telecommunication system in which the length of the twisted pair of telephone wires through which a video signal has passed is determined automatically, and the portions of the video signal across the video spectrum are amplified to a different extent which is inversely proportional to the attenuation of each portion so as to reconstruct the original signal. Since the system automatically determines the length of the twisted pair, the same equipment can be used to receive full motion, color video signals over twisted pairs of telephone wires without the necessity for customizing the system for telephone lines connected thereto by strapping certain resistor and capacitor networks into the system. Rather, the system automatically determines the length of each twisted pair of wires through which the video signals are transmitted and automatically compensates for differences in the lengths of different pairs of twisted wires feeding into the system without the use of computers to analyze and monitor the signal degradation.

The system performs the reconstruction of a degraded video signal by comparing the signal strengths received over a twisted pair of telephone wires with the strength of the signal transmitted, which is known. The ratio of these strengths determines the extent of attenuation that has occurred at known frequencies thereby indicating the length of the twisted pair through which the signal has passed. The signal is thereupon amplified automatically to provide the appropriate signal reconstruction.

As a result, in a video system according to the present invention, the same equipment is able to receive full motion, color video signals from a number of different twisted pairs of telephone wires and compensate for the degradation of the video signal separately and uniquely for each different length of a pair of twisted wires connected to it.

Another important aspect of the invention resides in the provision of a two-wire or four-wire video switching system. When four wires are used, video conferencing can be established, while two wires will provide cable TV capabilities and/or video dial tone and/or security surveillance utilizing a PC or TV Monitor. This allows a number of different subscribers to communicate with each other while using full motion, color video through a switching matrix utilizing personal computers and/or TV monitors, attached physically or logically to color monitoring devices such as TV, security devices, or other processing devices of the type that are widely used throughout business, industry, and in homes.

Network subscribers can not only speak to other subscribers through the switching system, but can also see those subscribers using full motion video signals that are generated by a video camera and transmitted over ordinary pairs of unloaded, shielded or unshielded twisted telephone wires. The system of the present invention makes possible interactive communications using video to provide individuals with the ability to make faster and better decisions remotely. This greatly facilitates problem solving as well as management and provides a high quality telecommunication and video service as well as broadcast capabilities to all users on the network that is available at an affordable cost to even ordinary telephone subscribers. The system of the invention employs a video server that lets users in several locations, such as on a campus environment, join in on a single video augmented call using their desktop computers.

The advanced technology of the present invention allows the users to interface with others using such compressed conferencing technology as Picture Tel, CLI, Hitachi and other board room video conferencing coder/decoder (codec) systems, ATM, Switch 56, or ISDN for MAN/WAN. People utilizing Microsoft® Windows programs 3.1 and higher can use the interactive multimedia system of the invention to see each other in a scalable full motion video window on their personal computers and/or TV monitors as they interact visually while talking to each other. They can simultaneously collaborate on computer documents.

For example, a buyer can work closely with an engineer by sharing documents. Using the interactive, multimedia network, users can compare purchase orders or product specifications and collaborate on changes by making notations for modifying files on the screen. A process that once would have taken days as documents were sent back and forth can now be completed in a few minutes.

The ability to receive movies and other programs over ordinary, standard, twisted pairs of telephone wires that have been proposed in the communications industry is now a reality utilizing the system of the present invention. The invention employs software that interfaces with futuristic applications of the information Super-highway such as home entertainment, catalog shopping, education and other multimedia services to the home as well. Multimedia services as offered today by internet/intranet providers should not be confused with this technology. The invention provides full motion (background and foreground), not slow scan, as offered by multimedia intranet/internet providers.

Among the different applications that the interactive multimedia network of the invention provides are desktop full motion video conferencing, security surveillance via unshielded, twisted pairs (UTP) of telephone wires, medical and patient care through a full motion video network system while monitoring vital signs of the patient, multimedia local area network (LAN) systems, sports facility video network systems, cable TV, video on demand, pay for view distribution, and distant learning.

A further feature of the system of the present invention is that full motion, color video transmission of broadcast quality can be achieved utilizing the system of the present invention. While the equipment disclosed in U.S. Pat. No. 5,283,637 is capable of providing and receiving a broad band video signal of at least 4.5 megahertz bandwidth, the equipment of the present invention more than doubles the bandwidth of a video signal that can be transmitted and received. This allows the circuitry to provide a clean bandwidth of more than 20 megahertz. Such a system meets the standards of video broadcast set forth by the PAL, SECAM, and ATTC video transmission standards. Moreover, the system of the invention can also be used to transmit HDTV signals and other digitized signals that fall within the bandwidth as well.

Still another feature of the invention is the rejection of common mode signal irregularities in a differential mode signal. A pure, differential mode, broadband signal has positive and negative components which appear as mirror images of each other in a pure signal. However, spikes impressed upon the signal will affect both signals equally and with the same polarity of distortion. Since the wires through which the signal components are transmitted are twisted about each other throughout their lengths, they are subjected to the same influences equally. By subtracting out influences that affect the signal components with distortion in the same direction, noise can be greatly eliminated as an influence in the reconstructed signal.

Other important features of the invention will also become apparent from an evaluation of the preferred embodiments of the invention as depicted and described herein.

The invention may be described with greater clarity and particularity by reference to the accompanying drawings.

DESCRIPTION OF THE DRAWINGS

FIG. 2 is a video switch block diagram disclosing the video switching system according to the invention.

FIG. 17 is a schematic diagram of the receiver shown in FIG. 14.

DESCRIPTION OF THE EMBODIMENTS

Figure 1:
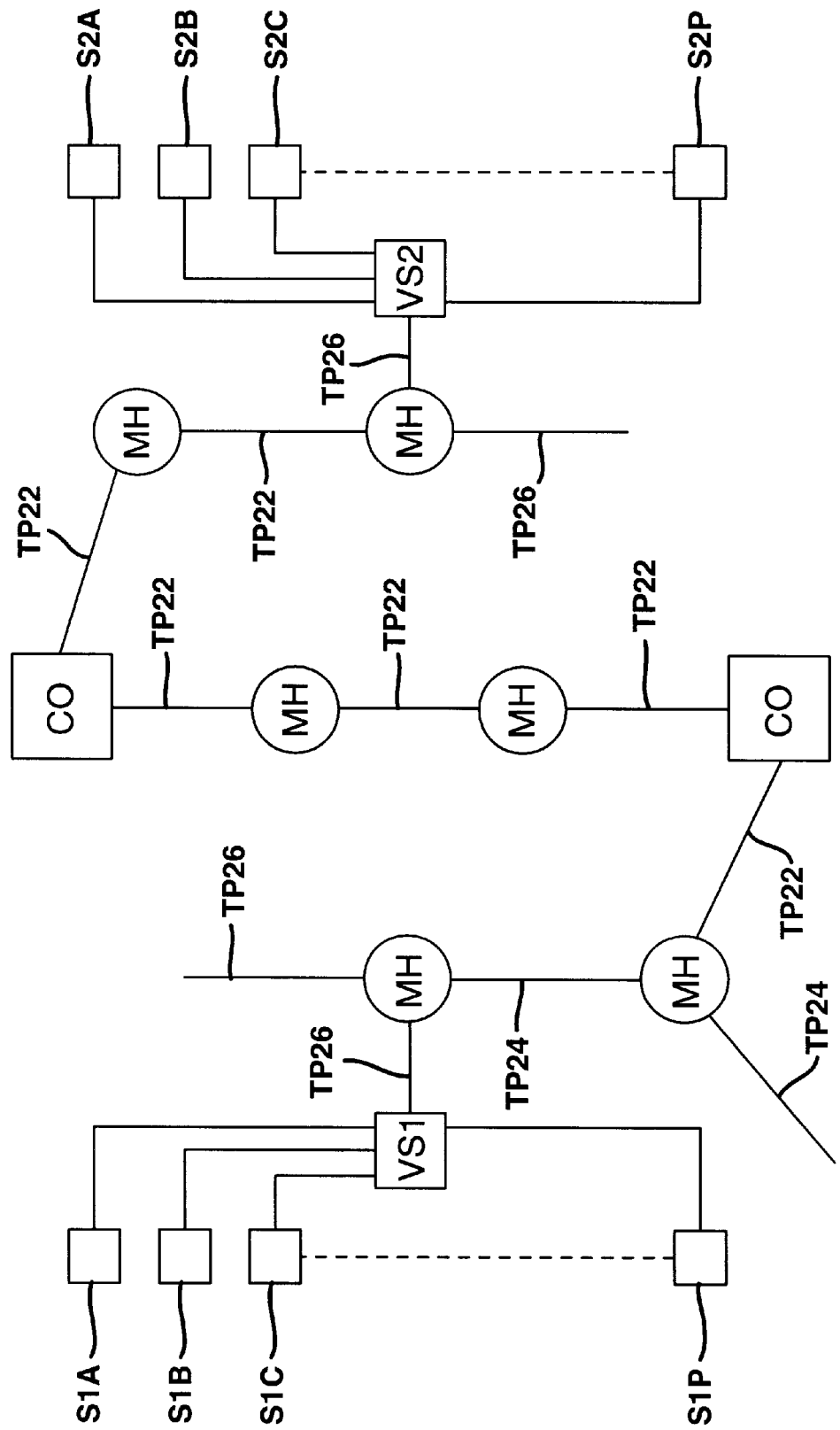
FIG. 1 is a block diagram of a typical communication system according to the invention.

FIG. 1 illustrates diagrammatically a network showing communication paths between subscribers utilizing the system of the invention. A group of subscribers S1A, S1B, S1C through S1P are coupled to a video server station VS1. Each of the stations S1A through S1P is coupled to the video server station VS1 by a different telephone connection line. Each video server location includes a computerized system manager and a sixteen by sixteen cross-matrix switching system indicated generally at 10 in FIG. 2. The cross-matrix switching system 10 is expandable to any number of channels in multiples of sixteen channels. That is, it may service 16×n user interfaces. The system manager is a computer control that provides control signals to the cross-matrix switching system 10 at each video server location. Each switching system 10 is connected to the commercial telephone central office infrastructure system by a connection formed of a twisted pair of insulated copper wires of sixteen, twenty-two, twenty-four, or twenty-six gauge (AWG).

The telephone company local infrastructure is illustrated generally in FIG. 1. By transmitting broadband video signals over twisted pairs of telephone wires the subscribers S1A through S1P at one location can communicate among themselves or with remote subscribers S2A through S2P, which in turn are connected to the telephone company infrastructure through another video server VS2. The video server VS2 is likewise a computerized system employing, for example, a sixteen by sixteen matrix switching system 10 of the type depicted in FIG. 2. Each end user S1A through S1P and S2A through S2P has a computer and also a desktop video network unit DVN100, depicted and described in conjunction with FIGS. 5 through 11. This is but one example of the 16×n user interfaces.

The functional organization of a local telephone company subscriber system is illustrated diagrammatically in FIG. 1. That is, each subscriber location is serviced by a telephone company central office, indicated at CO. Communication links to the subscriber location are in the form of twisted pairs of telephone wires that extend either underground through manholes or overhead on telephone poles. The twisted pairs of telephone wires are housed in cables which provide physical protection for the wires. Each cable carries a multiplicity of twisted pairs.

In order to maintain signal strength the twisted pairs pass through locations at which they are amplified by repeaters. For underground cables repeaters are located in manholes while cables that are strung overhead on telephone poles are terminated in junction boxes called "B-boxes" which contain repeaters. Communication between central offices may be through twisted pairs, although central offices are often connected together by trunk lines as well. Trunk lines typically carry a number of different communications multiplexed at spaced frequencies over the same pair of telephone wires.

Each of the video servers VS1 and VS2 is ultimately connected to one or more telephone company central offices indicated at CO in FIG. 1 through lengths of twisted pairs of wires. The automatic compensation feature of the invention facilitates utilization of an existing telephone infrastructure. For example, a central office CO services an area from the central office hub to the last point feeding into the central office for an average distance of 4.5 miles. Between central office hubs CO there are typically several manholes MH, B-boxes, and interconnections in line between the central office and the subscriber VS1 or VS2. Depending upon the distance from the central office hub, different cable gauges are employed in the twisted pairs of telephone wires. By utilizing the automatic compensation system hereinafter described, a bandwidth of 20 MHz can be maintained from the central office hub CO to the end user VS1 or VS2. Thus, the system has the capability of meeting the demands of video conferencing, remote meter reading, telephone services, and even patient monitoring using live video as well as monitoring for vital signs.

The local infrastructure of a telephone company is set up so that the existing lengths of twisted pairs of wires TP leading from subscriber locations pass through a manhole, indicated at MH. The lengths TP26 of pairs of twisted telephone wires are typically no greater than 6,000 feet in length and may, for example, be formed of 26-gauge wire. Also, additional lengths TP22 or TP24 of twisted pairs of wires connect one manhole to the next, and ultimately connect a manhole to a central office CO. Some of the lengths of wire are 22-gauge and are designated as TP22. Other lengths of pairs of twisted wires are 24-gauge and are designated TP24. Still other lengths of pairs of twisted wires in a local telephone company infrastructure are formed of 26-gauge wire and are designated as TP26 in FIG. 1. Each manhole typically contains repeater equipment that amplifies the signals received on the lengths of twisted pairs of wires and amplifies those signals as they are passed on to the next manhole MH, or ultimately to the central office CO.

The system of the invention involves automatic compensation or equalization that is applied to the lengths TP22, TP24, and TP26 of pairs of twisted telephone wires. This automatic compensation, or automatic equalization, is described hereinafter. Each automatic compensation system can easily reconstruct a video signal passing over 6,000 feet of pairs of twisted wires.

While the system of the invention can automatically compensate for lengths of twisted pairs of wires that are greater than 6,000 feet, a better quality of signal can be reconstructed by locating the automatic compensators of the invention within the manholes MH so that each video signal is subjected to automatic compensation after passing through no more than 6,000 feet of a pair of twisted telephone wires. With repeaters employing equalizers according to the invention, the video signals to and from the video servers VS1 and VS2 can easily pass through several manholes MH over lengths much greater than 6,000 feet without any significant signal degradation. The twisted pair lengths extending from one manhole to the next will vary from one location to the next, but are typically formed of either 22, 24, or 26-gauge wire. The twisted pairs of wires linking manholes MH to the central offices CO likewise may vary in gauge, but are typically 22-gauge lengths indicated as TP22 in FIG. 1.

Figure 4:
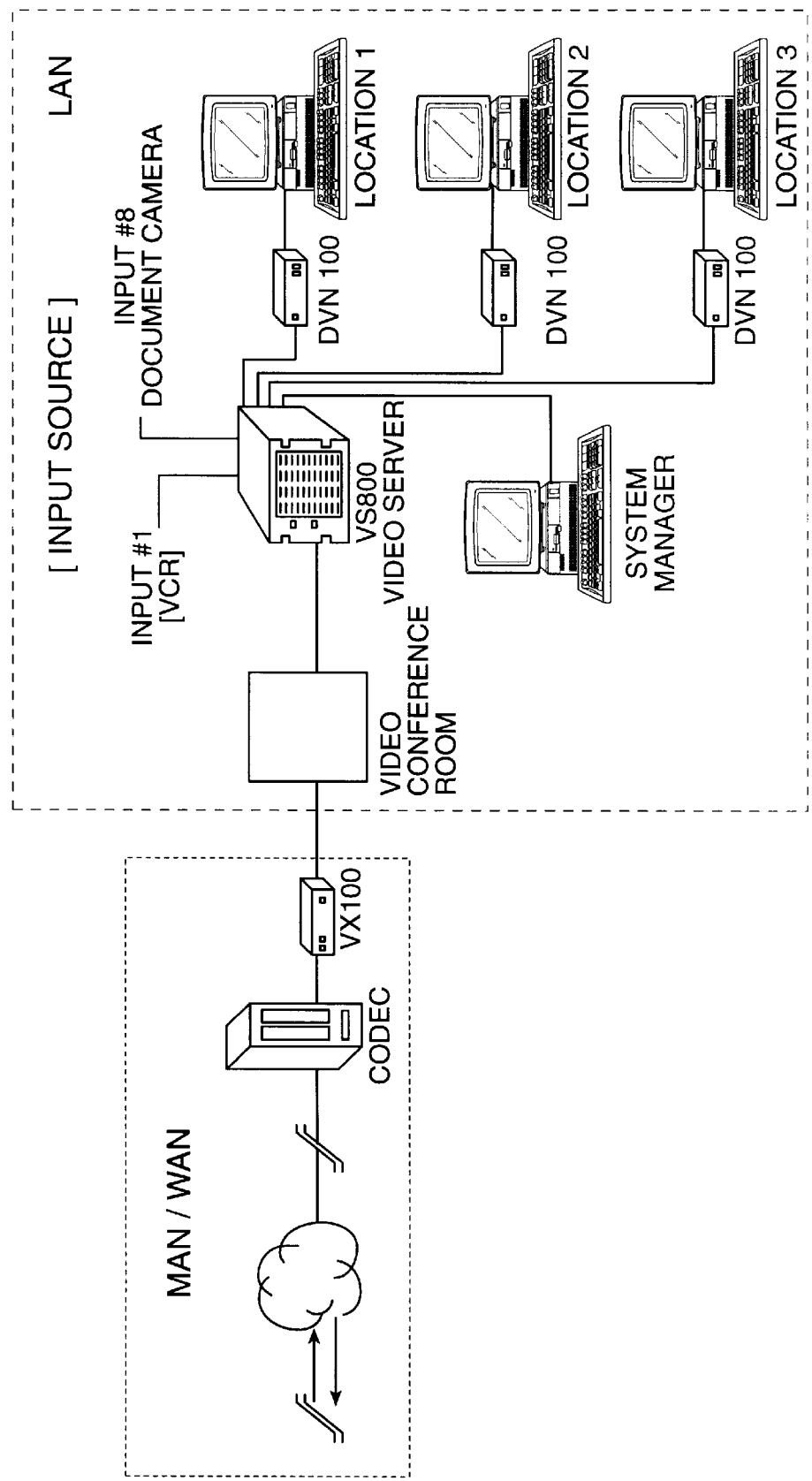
FIG. 4 is a block diagram of a video conferencing system according to the invention.

FIG. 4 is a block diagram illustrating computers connected in a local area network (LAN) at locations indicated as LOCATION1, LOCATION2, AND LOCATION3. Each of the computers at the three locations employs a DVN100 desktop video network unit. Any or all of the stations S1A through S1P and S2A through S2P of FIG. 1 may be interconnected as depicted in FIG. 4.

All of the DVN100 units are connected by a pair of twisted telephone wires to a video server location designated as VS800. The video server location employs a system manager computer as illustrated. The VS800 includes not only inputs from the DVN100 units, but also auxiliary video inputs, such as INPUT#1 from a video cassette recorder and INPUT#8 from a document camera.

Some participants in a conference may be located in a video conference room. However, other participants need not be physically present in the video conference room, but can still participate visually using the desktop video network units of the invention. Furthermore, the system may additionally employ even more extended teleconferencing capabilities through use of a MAN/1 and a video conferencing coder/decoder (codec), which may be remotely located. These communication devices are connected to the system using a VX100 video transducer.

VIDEO SWITCH

FIG. 2 illustrates the video switching system 10 that employs a sixteen by sixteen cross-matrix switch 11, shown in detail in the schematic diagrams of FIGS. 3A, 3B, 3C, and 3D. The cross-matrix switch 11 is made up of four eight by eight one-way, single ended, cross-matrix switches coupled in parallel, two forward and two reversed. The cross-matrix switch 11 includes inputs from and outputs to sixteen different channels, for example.

In the exemplary arrangement illustrated the inputs transmitted to the cross-matrix switch 11 are numbered CHT1 through CHT16. The outputs that are received from the cross-matrix switch 11 are numbered CHR1 through CHR16. Depending on the configuration, the numbering sequence may change. Each of the channels provides a connection to the cross-matrix switch 11 by input connections from the channels CHT1 through CHT16 in the form of RJ48 modular phone jacks, indicated collectively at 14, and output connections by corresponding RJ48 modular phone jacks indicated collectively at 15. The difference between an RJ48 telephone jack and a conventional RJ11 telephone jack lies primarily in the physical pin configuration. Specifically, an RJ48 jack has eight pins while an RJ11 jack has six pins.

The RJ48 jacks 14 are connected by balanced transmission lines indicated collectively at 16 to balanced-to-unbalanced, single-ended impedance conversion circuits 12. Each of the conversion circuits 12 is provided with automatic equalization for the line length of an unshielded twisted pair (UTP) compensation. Each of the impedance conversion circuits 12 is coupled to an unbalanced transmission line 17 that in turn is connected to the cross-matrix switch 11.

The outputs of the cross-matrix switch 11 are unbalanced transmission lines 19 that are connected to unbalanced-to-balanced impedance matching and line drive (UTP) circuits 13. The circuits 13 are in turn connected to the output channels indicated at CHR1 through CHR16 by means of balanced transmission lines 16'. The balanced transmission lines 16' are connected to the RJ48 jacks 15 at each channel CHR1 through CHR16 .

The cross-matrix switch 11 also includes a bus interface and control logic circuit 18, a parallel control interface port 20 from the computer, and a serial control interface port 22 from the computer. A bus interface and control logic circuit 24 is also provided, as well as an RJ11 6P6C interface port 26.

Figure 3A:
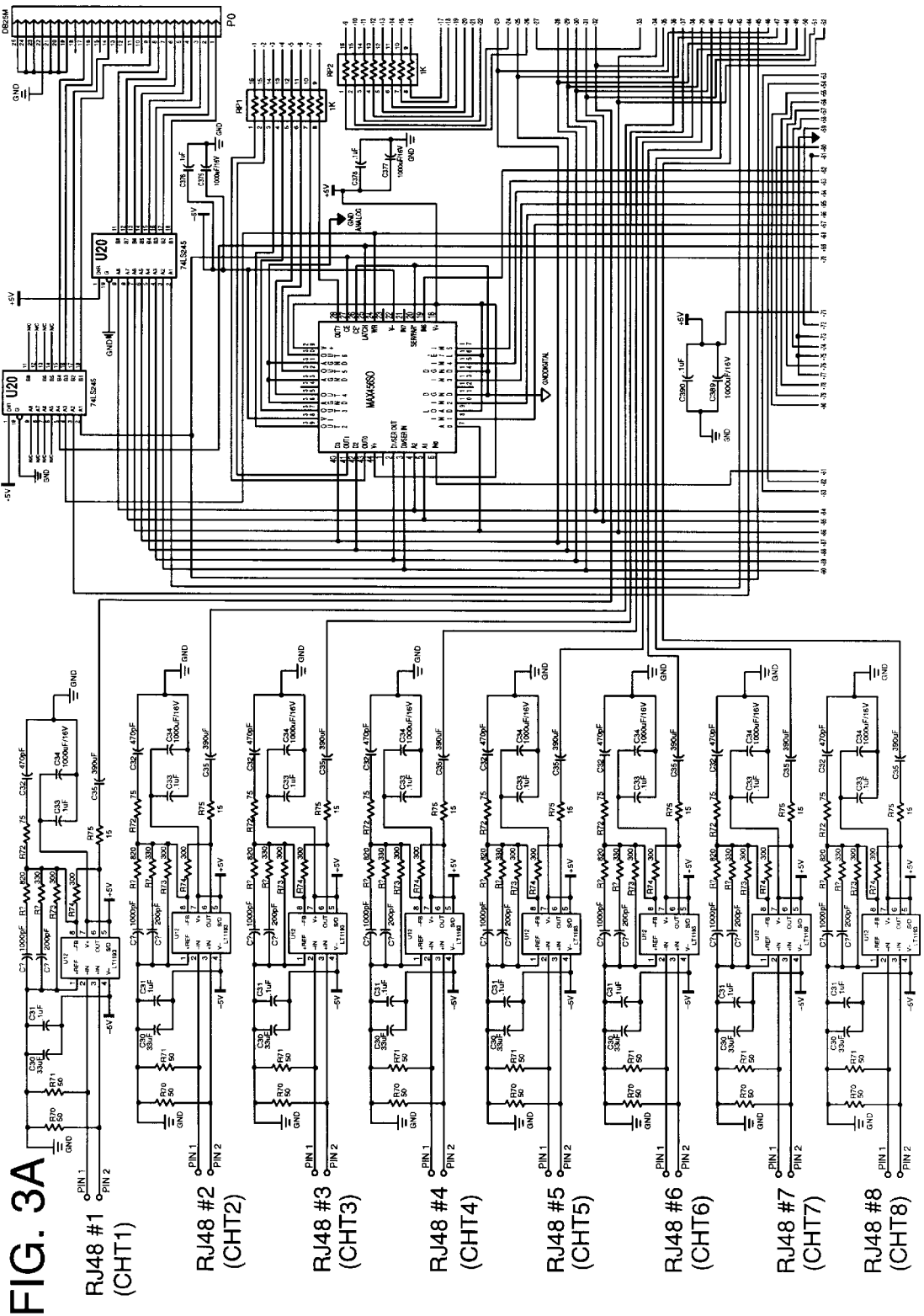
FIG. 3A is the upper, left-hand portion of a schematic diagram of the cross-matrix switch shown in FIG. 2.

Operation of the circuit 10 may be described in greater detail with reference to schematic drawing FIGS. 3A through 3D. FIG. 3A, for example, indicates inputs at pin 1 and pin 2 of each of the transmit channels CHT1 through CHT8 from each of the stations S1A through S1H. The inputs from transmit channels CHT9 through CHT16 for stations S1I through S1P are shown in FIG. 3C. These inputs are differential signals which are provided as mirror image, positive and negative broadband video signals of at least 6.0 megahertz. The differential pair of inputs on pins 1 and 2 from each input channel are sent to an impedance conversion circuit 12, the operative chip of which is an LT1193 conversion chip U12 for each input channel labelled CHT1 through CHT16.

In the embodiment of FIGS. 1 and 3A through 3D, each of the stations S1A through S1P is connected to the cross-matrix switch 11 by the same length of a pair of unshielded, twisted wires, which in the embodiment illustrated is 1000 feet. That is, each transmission line 16 is 1000 feet in length. The compensating circuit chips U12 each introduce a predetermined correction across the bandwidth of the signals received on pins 1 and 2 so as to reconstruct those signals according to the principles set forth in U.S. Pat. No. 5,283,637. The outputs from the conversion circuits 12 therefore represent the reconstructed video signals compensated for the nonlinear attenuation that occurs over 1000 feet of an unshielded, twisted-pair of telephone wires.

The mirror image, negative and positive differential input signals from each of the channels CHT1 through CHT16 appear, respectively, at pins 2 and 3 of the corresponding compensating circuit chips U12 to which each transmitting channel CHT1 through CHT16 is connected. The compensating circuit chips U12 impose compensating amplification upon these input signals corresponding to, and inversely proportional to the attenuation imposed upon these signals through the 1000 feet of pairs of twisted telephone wires. Each compensating circuit chip U12 provides an output on pin 6 thereof. These outputs are reconstructed inputs from channels CHT1 through CHT16 and are directed to the four MAX456SO switching chip circuits U1, U1A, U2, and U2A. The outputs from the compensating circuit chips U12 appear at the pins labelled IN1, IN2, IN3, IN4, and IN5 of the switching chips U1, U2, U1A, and U2A as shown in FIGS. 3A through 3D.

The switching circuit inputs are coupled to the MAX456SO chips so that each input channel CHT1 through CHT16 can be switched to communicate with each output channel CHR1 through CHR16.

The switching that occurs is performed under the control of a server computer labeled DB25M in FIG. 3A. The control outputs from server computer DB25M provide inputs to a data buffer. The data buffer is formed of two 74LS245 data buffer IC chips labeled U20 in FIG. 3A. The outputs from data buffer chips U20 provide inputs to the four MAX456SO switch chips as illustrated in FIGS. 3A, 3B, 3C and 3D. These signal inputs from the server computer DB25M determine which one or combination of the receive channels CHR1 through CHR16 will receive the signals from the transmitting one of the channels CHT1 through CHT16.

The control inputs from the video server computer and/or modem access DB25M appear at pins 1N0, D1, D0, A2, A1, A0, D2, and D3 to the switching chips U1, U2, U1A, and U2A. The compensated video inputs from channels CHT1 through CHT16 appear at input pins 1N1, IN2, IN3, IN4, and IN5. Under the control of the video server inputs, the line video inputs from the transmitting channels CHT1 through CHT16 are switched to selected receiving channels CHR1 through CHR16 by connections across output pins OUT2, OUT3, OUT4, OUT5, OUT6, and OUT7 of the switching chips U1, U2, U1A, and U2A.

Figure 3B:
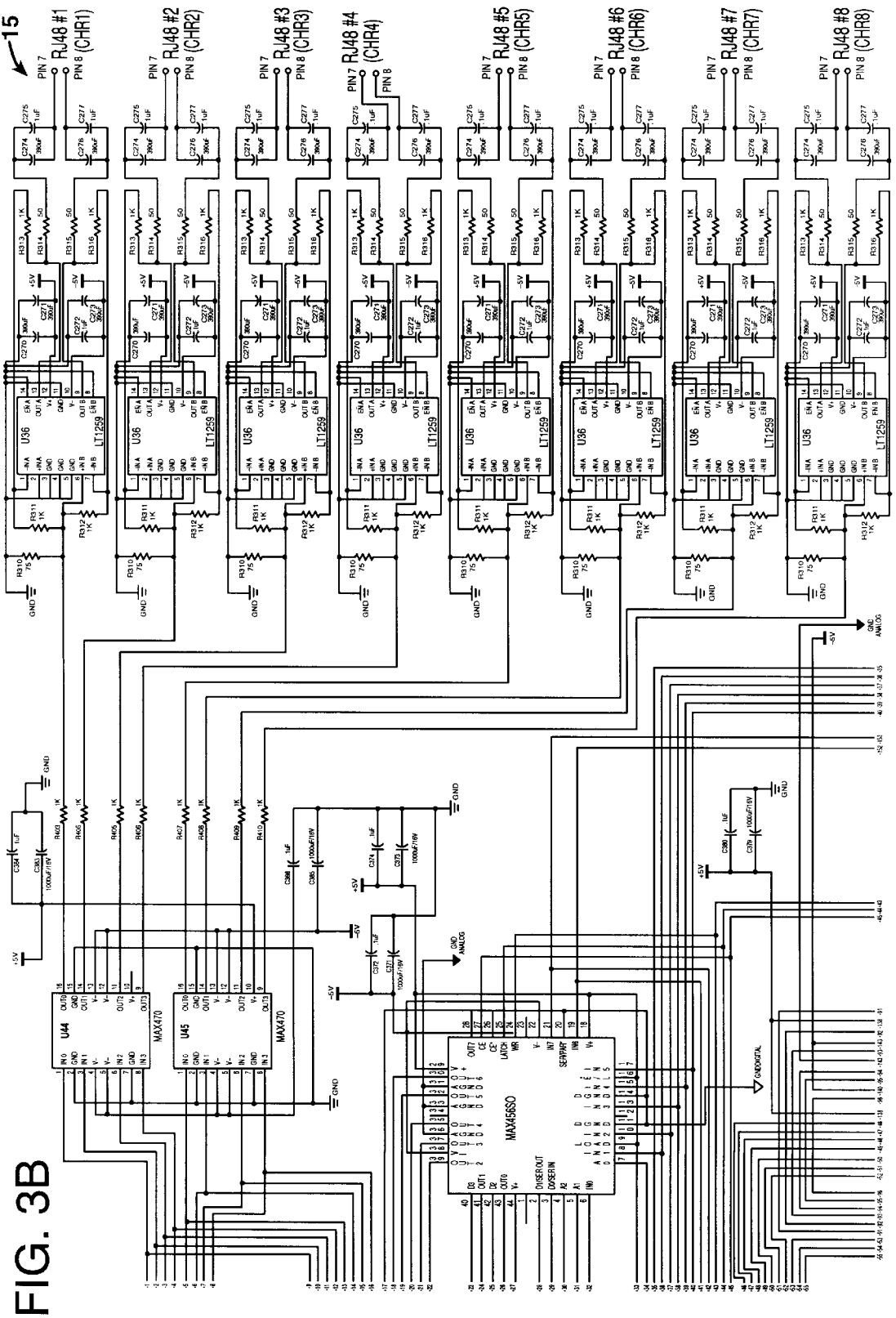
FIG. 3B is the upper, right-hand portion of the schematic diagram of the cross-matrix switch shown in FIG. 2 and is located immediately to the right of FIG. 3A.
Figure 3C:
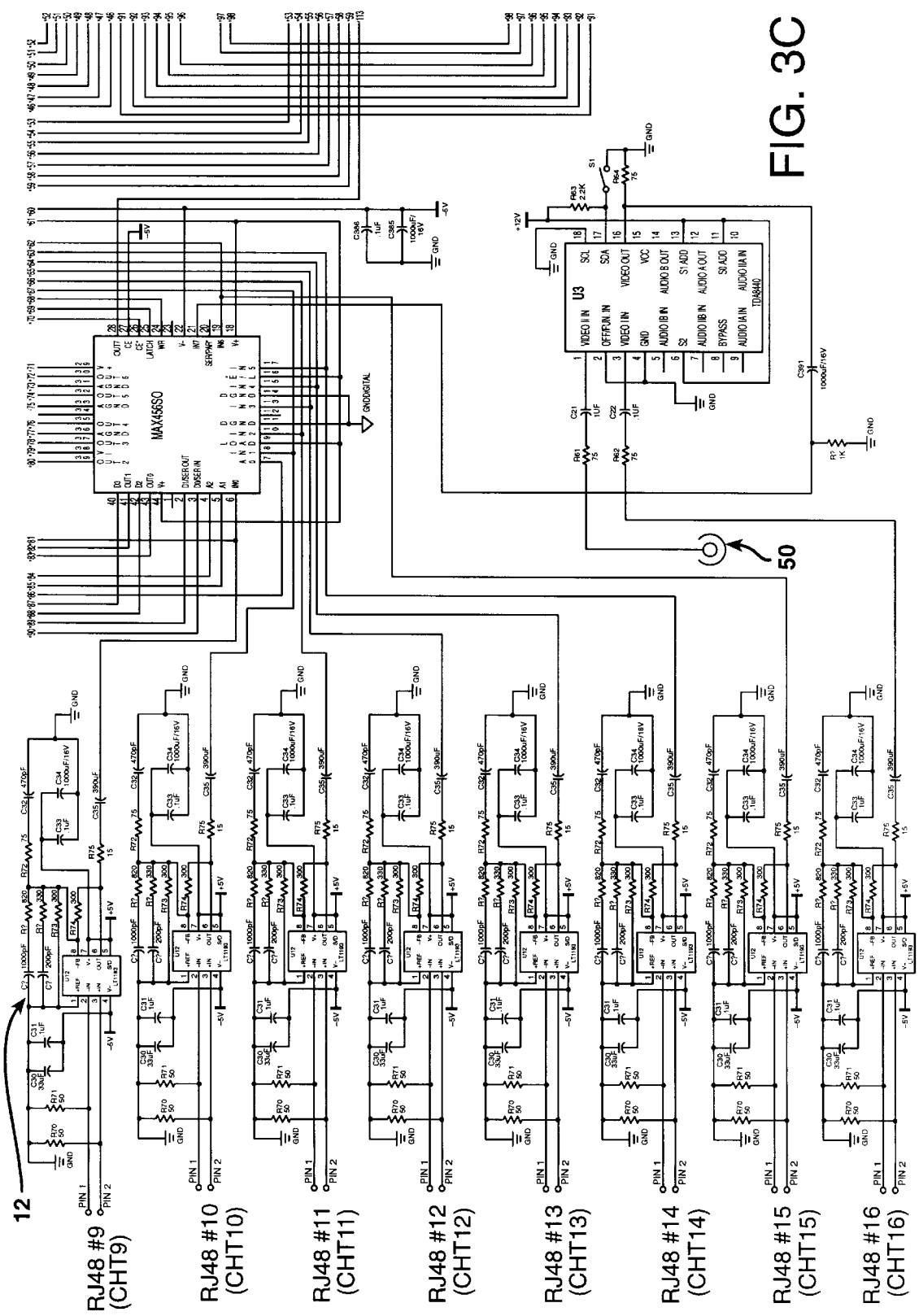
FIG. 3C is the lower, left-hand portion of a schematic diagram of the cross-matrix switch of FIG. 2 and is located immediately beneath FIG. 3A.
Figure 3D:
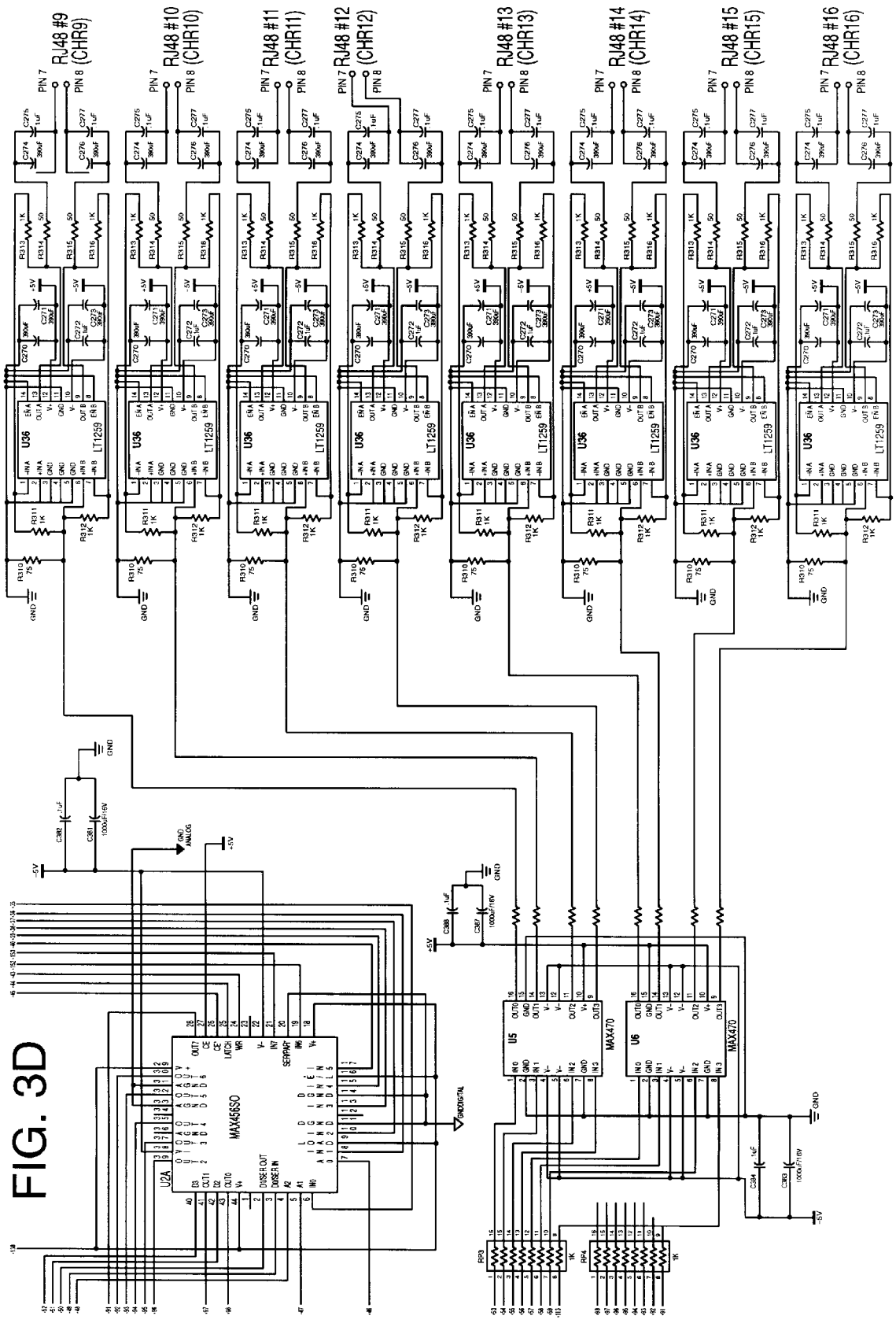
FIG. 3D is the lower, right-hand portion of a schematic diagram of the cross-matrix switch of FIG. 2 and is located immediately to the right of FIG. 3C and immediately below FIG. 3B.

The outputs from the switching chips are directed to single-ended-to-differential conversion circuits U36, shown in FIGS. 3B and 3D, which are LT1259 IC chips. The conversion chips U36 convert the single-ended, common-mode inputs thereto to positive and negative, differential-mode outputs which appear at pins OUTA and OUTB from each of the conversion chips U36. These outputs are conditioned by a network of 390 microfarad and 0.1 microfarad capacitors that set the gain applied to the differential signal. The video output signals are then passed through resistor networks and through load isolation capacitors to pins 7 and 8 of the RJ48 jack connections 15 at each of the line output channels CHR1 through CHR16.

The broadband signals at pins 7 and 8 are differential-mode signals. That is, each broadband signal on pin 7 has the reverse polarity of and is the mirror image of the corresponding broadband signal on pin 8 from each of the differential convertors U36.

In FIG. 3C there is a video input connector indicated at 50. This is a fifty ohm RC-type connector through which any video signal may be provided as an input to be broadcast to all of the users S1A through S1P. The video signal from the RC jack 50 is a differential signal and is provided at pins 1 and 3 of chip U3. Chip U3 is a TDA8440 integrated circuit chip. Switch S1 at the output of chip U3, when closed, patches the video signal from jack 50 through to all of the stations S1A through S1P.

DVN100

Figure 5:
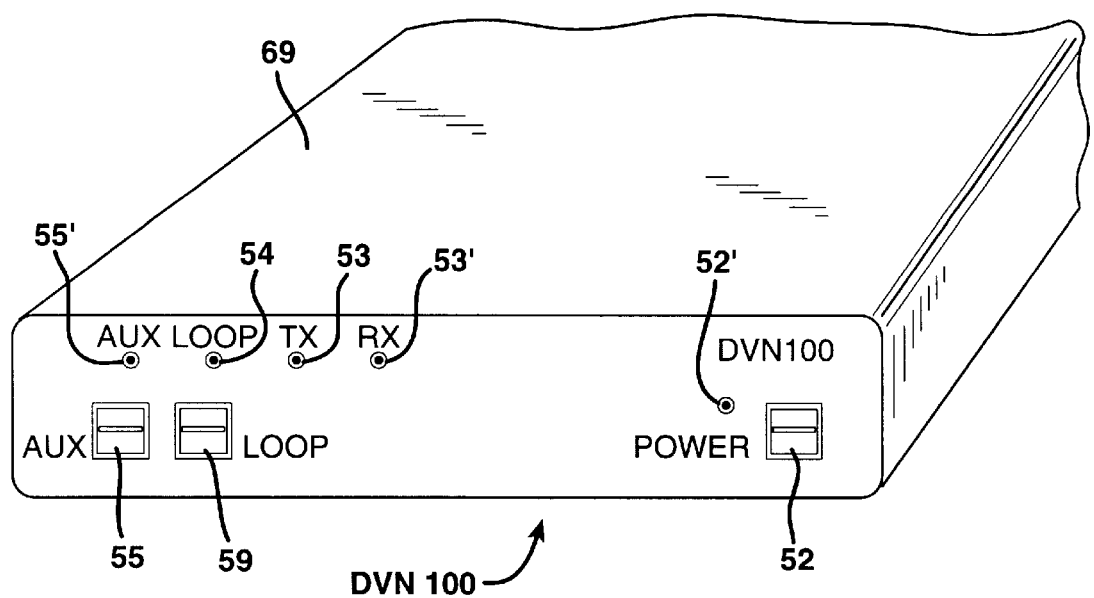
FIG. 5 is a perspective view of the front panel of one embodiment of the desktop video network units employed at each subscriber location in FIG. 1.
Figure 6:
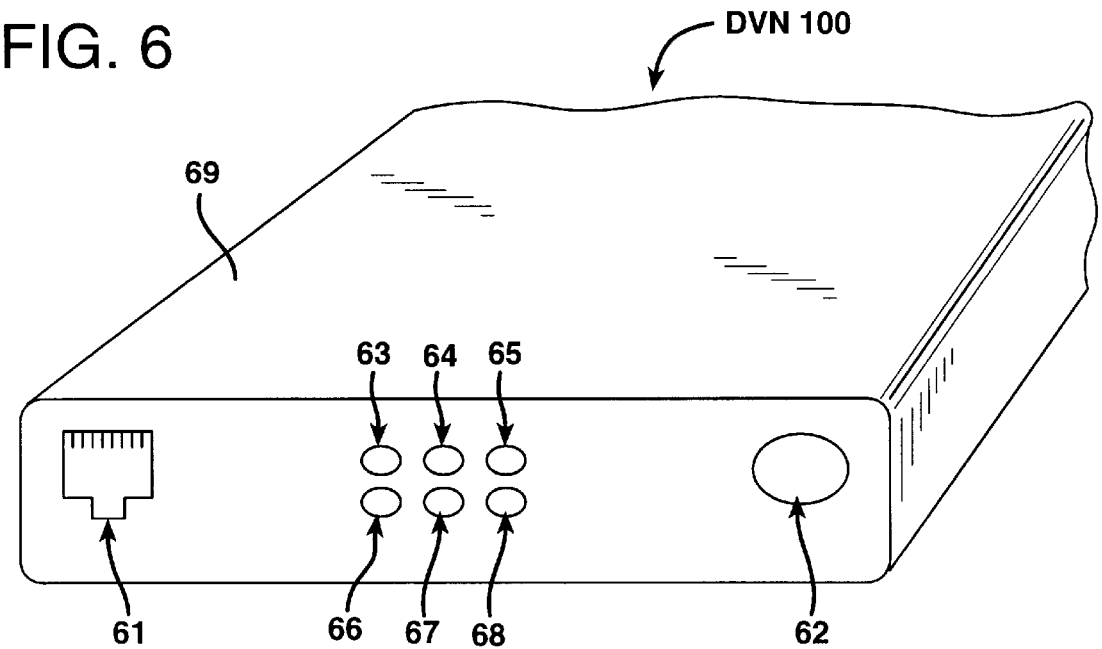
FIG. 6 is a perspective view of the rear panel of the embodiment of the desktop video network unit of FIG. 5.

One embodiment of the desktop, video network unit employed at stations S1A through S1P is illustrated in FIGS. 5 through 11. FIG. 5 illustrates the front panel of a desktop video network indicated at DVN100. FIG. 6 illustrates the rear panel of the DVN100.

The desktop, video network unit, model DVN100, employs a transceiver that operates over twisted pairs of telephone wires having lengths of between twenty and 1,200 feet. Over such twisted pair lengths the DVN100 transmits frequencies of over 4.5 megahertz of full-color video without degradation.

Power, Switch & LED

Each DVN100 unit is housed in a durable, plastic or sheet metal casing 69. The print POWER on the front panel of the casing 69 indicates where the power switch 52 is located on the equipment. The power switch 52 is a rocker switch, (double pole double throw) with ON and OFF capability. The LED 52' indicates to the user when power is on to the DVN100. LED 52' is lit when power is ON and is not lit when power is OFF.

TX, RX & LED's

The print TX on the casing 69 means transmit. The LED 53 is located directly under the TX print. When illuminated, the LED 53 indicates to the user that information is being transmitted from the unit. When the DVN100 is not transmitting LED 53 is off. The print RX means receive. The LED 53' located directly under the RX print indicates to the user that information is being received by the unit when LED 53' is lit or is not receiving when the LED 53' is off.

Loop Switch and LED

The loop back switch 59 provides the user with the capability to view a video signal as it is transmitted it to a remote location. During the loop back mode the signal is transmitted both to the user and to a remote location or locations selected by the cross-matrix switch 11. When the LED 54 is lit, the viewer will not be able to see the signal received from a remote station, but rather only the signal that the user is transmitting. When the LED 54 is off the viewer will be able to see the received video signal coming from a remote station. The switch indicator 54 also informs the user of the status of his video grabber in the computer. That is, the LED 54 informs the user whether or not the viewer's video grabber is working.

Auxiliary Switch and LED

The auxiliary switch 55 allows switching of any video source available for transmission to any or all remote locations. This feature is unique to the desktop video network user interfaces of the invention. The LED 55' indicates to the user the active state of the transmission source. The user can switch between sources with ease and comfort. With this unique system, the user may choose a video camera with audio into inputs 63 and 66 and any other video and audio into inputs 65 and 68, all of which are located on the rear panel and are shown in FIG. 6.

FIG. 6 illustrates the rear panel of the DVN100. An RJ48 unshielded, twisted pair (UTP) interface is indicated at 61. Pins 1 and 2 of the RJ48 interface 61, shown for each of the transmit channels CHT1 through CHT16 in FIGS. 3A and 3C, conduct the signal being transmitted out of the DVN100. Pins 7 and 8 of the RJ48 jack interface 61, shown for each of the receive channels CHR1 through CHR16 in FIGS. 3B and 3D, transmit the signal from a remote location into the DVN100.

The twelve-volt DC power jack input to the rear panel of the DVN100 is indicated at 62. The input current to the DVN100 is two hundred milliamps. An RCA connector jack 63 carries an audio input of 20 Hz–20 kHz, 500 mV, p-p @ −3 dB. An RCA connector jack 64 carries an audio output of 20 Hz–20 kHz, 500 mV, p-p @ −3 dB. Jack connection 65 is also an RCA connector that carries an auxiliary audio input of 20 Hz–20 kHz, 500 mV, p-p @ −3 dB. Jack 66 is an RCA connector for NTSC, PAL, or SECAM color video input. Jack 67 is an RCA connector for NTSC, PAL, or SECAM color video outputs. Jack connector 68 is an RCA connector for an auxiliary NTSC, PAL, or SECAM color video input.

Figure 7:
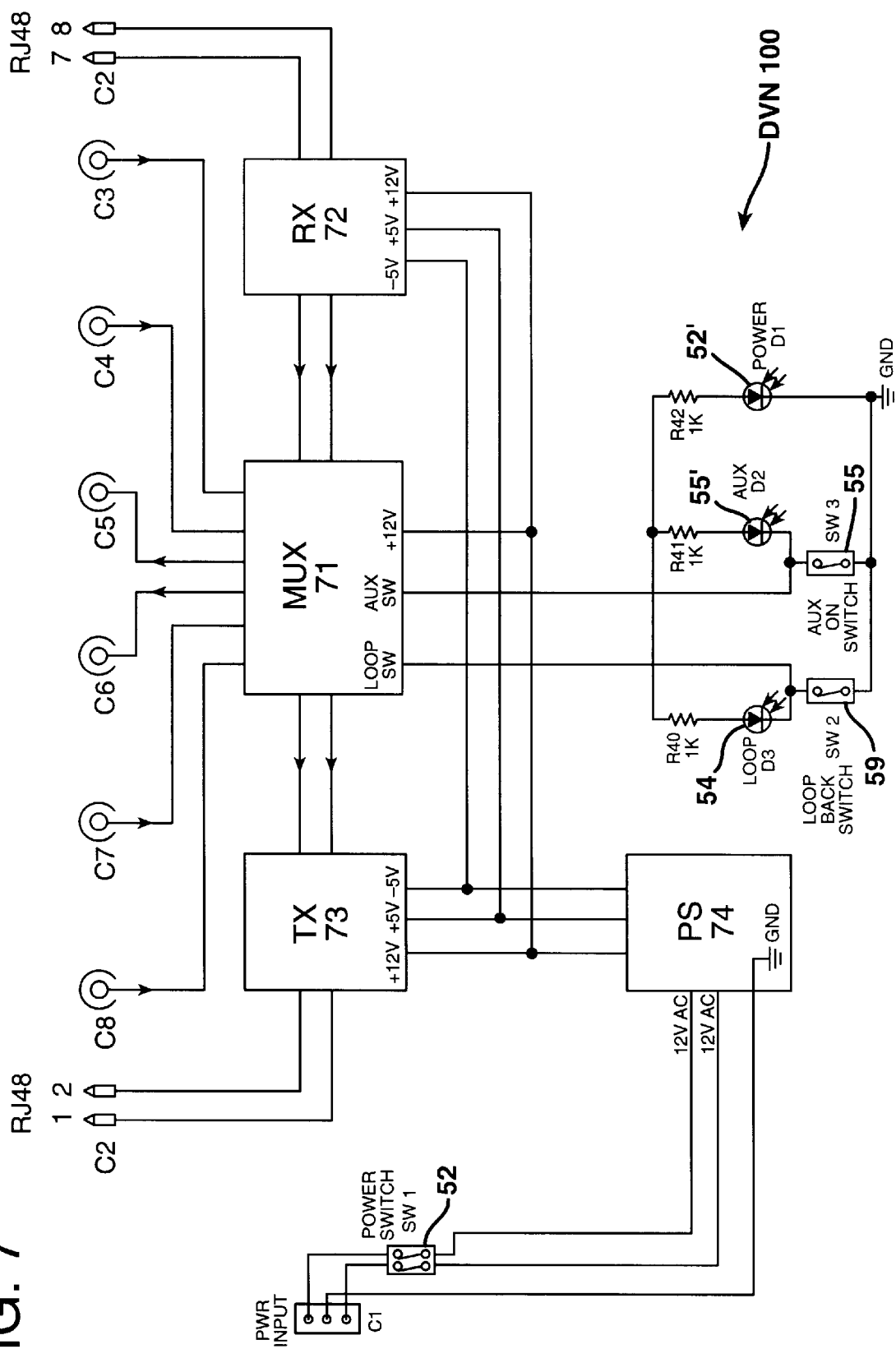
FIG. 7 is a block diagram of the operating components of the embodiment of a single desktop video network constructed according to the invention and shown in FIGS. 5 and 6.

As shown in FIG. 7, each DVN100 is comprised of a multiplexer 71, a receiver 72, a transmitter 73, and a power supply 74. The power supply 74 is illustrated schematically in FIG. 11. The power supply 74 is of the conventional type that is utilized to supply +12 volt, +5 volt, and −5 volt direct current outputs from positive and negative 12 volt DC power inputs to the multiplexer 71, the receiver 72, and the transmitter 73. An MC7805DRAK voltage regulator is used in the power supplies of all of the units described to provide a regulated +5-volt power supply.

The power supply may include electrical storage batteries. This allows the system to operate independently of any commercial alternating current power supply in the event of a general or localized power failure. As a consequence, the system is capable of maintaining lifeline telephone services during commercial power interruptions. In normal operation the power supply includes a trickle charge to the electrical storage battery cells. In the event of a power failure, a user is still able to dial essential lifeline services, such as emergency 911 calls, calls to hospitals, and other potentially life-saving communications. In areas where power is not available and in foreign countries, the system can function where solar cells can be used to provide telephone services.

As illustrated in FIG. 7, the outputs of transmitter 73 appear at pins 1 and 2 (C2) of the DVN100 RJ48 jack interface 61 and are coupled by twisted pairs of telephone wire to corresponding inputs pins 1 and 2 of the RJ48 jack interface 14 of the switching circuit 11 of the video server VS1 shown schematically in FIGS. 3A and 3C. Likewise pins 7 and 8 of the DVN RJ48 jack interface 61 leading to the receiver 72 are coupled to corresponding pins 7 and 8 of the RJ48 jack interface 15 of the switching circuit 11 shown schematically in FIGS. 3B and 3D.

Multiplexer 71

Pin C5 in FIG. 7 is the video output from the DVN100 multiplexer 71 to a personal computer located at the same user station as the DVN100. A connector from pin C5 typically plugs into a video graphic card in the computer or into a jack in a regular computer monitor. Pin C6 is the audio output jack that is coupled to the audio input to a computer or monitor. Pins C7 and C8 are respectively jack connections for video and audio inputs to the multiplexer 71 from the user's personal computer. Jacks C3 and C4 are, respectively, auxiliary video and audio inputs to the multiplexer 71 from an auxiliary audio-video source, typically a commercially available video camera that is under the control of the operator of the station at which the DVN100 unit is located.

Figure 8:
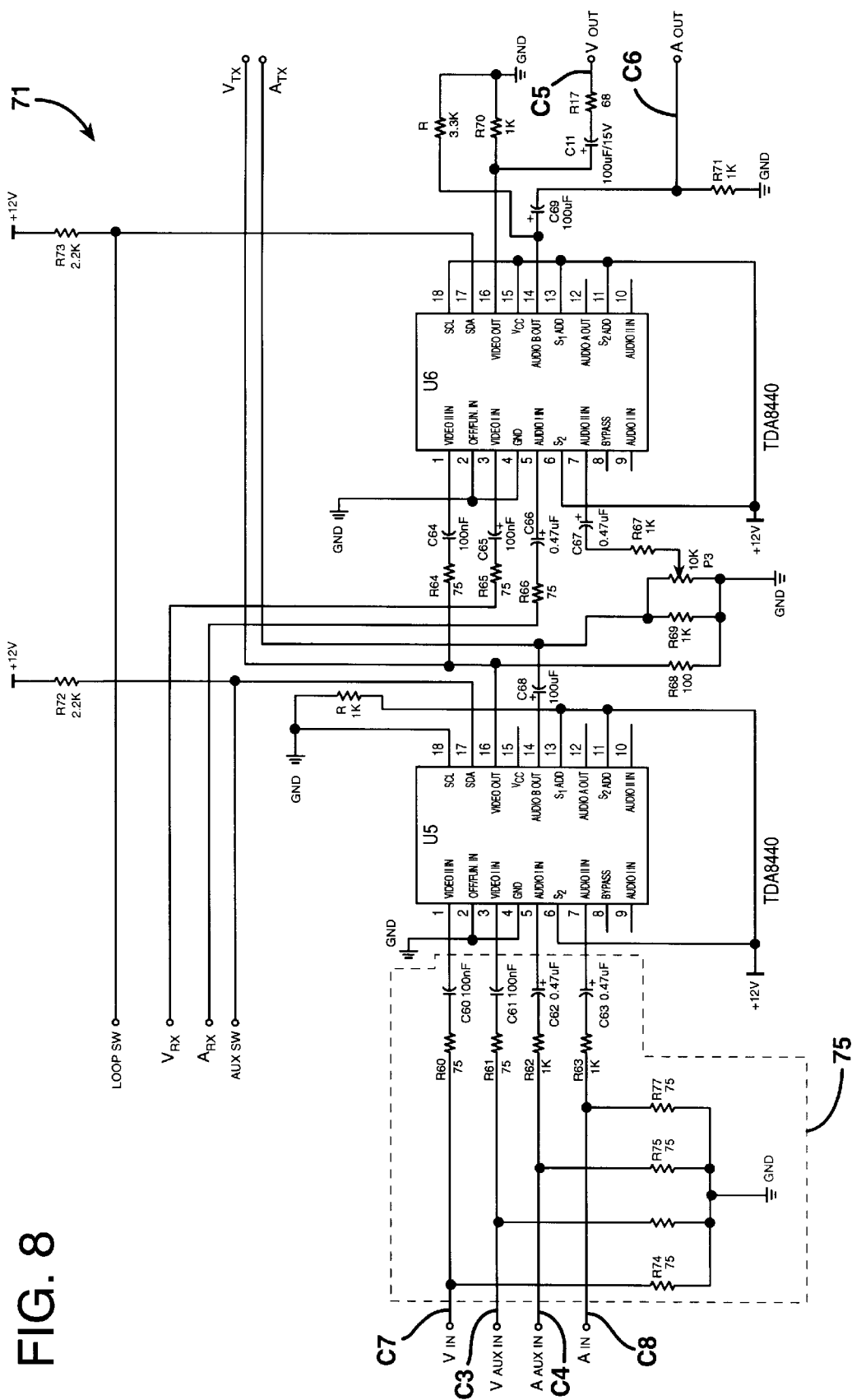
FIG. 8 is a schematic diagram of the multiplexer unit shown in FIG. 7.

The multiplexer 71 for the DVN100 is illustrated schematically in FIG. 8. The C3, C4, C7, and C8 inputs enter the multiplexer 71 through a terminating register 75. The resistors and capacitors within the terminating register 75 provide video matching for the video and audio input signals. Chip U5 is a TDA8440 IC chip that serves as a toggle switch. The toggle switch U5 is actuated by a signal at its SDA pin from the AUX SW line. Actuation occurs in response to a change in the condition of the auxiliary switch 55, shown in FIG. 5.

Another TDC8440 IC chip is provided to serve as a toggle switch U6. Toggle switch chip U6 allows a user, by operating the loop switch 59, shown in FIG. 5, to either display incoming reception from a remote station, or to display the video signal being transmitted out of the DVN100. When the switch 59 is operated in the loop mode to display the outgoing transmitted signal, the LED 54 is illuminated. Signals from switch 59 to the toggle switch U6 are provided at the SDA pin thereof from the LOOP SW line. The V OUT signal at C5 and the A OUT signal at C6 are connected as video and audio inputs, respectively, to the video grabber in the user's personal computer.

Receiver 72

Figure 9:
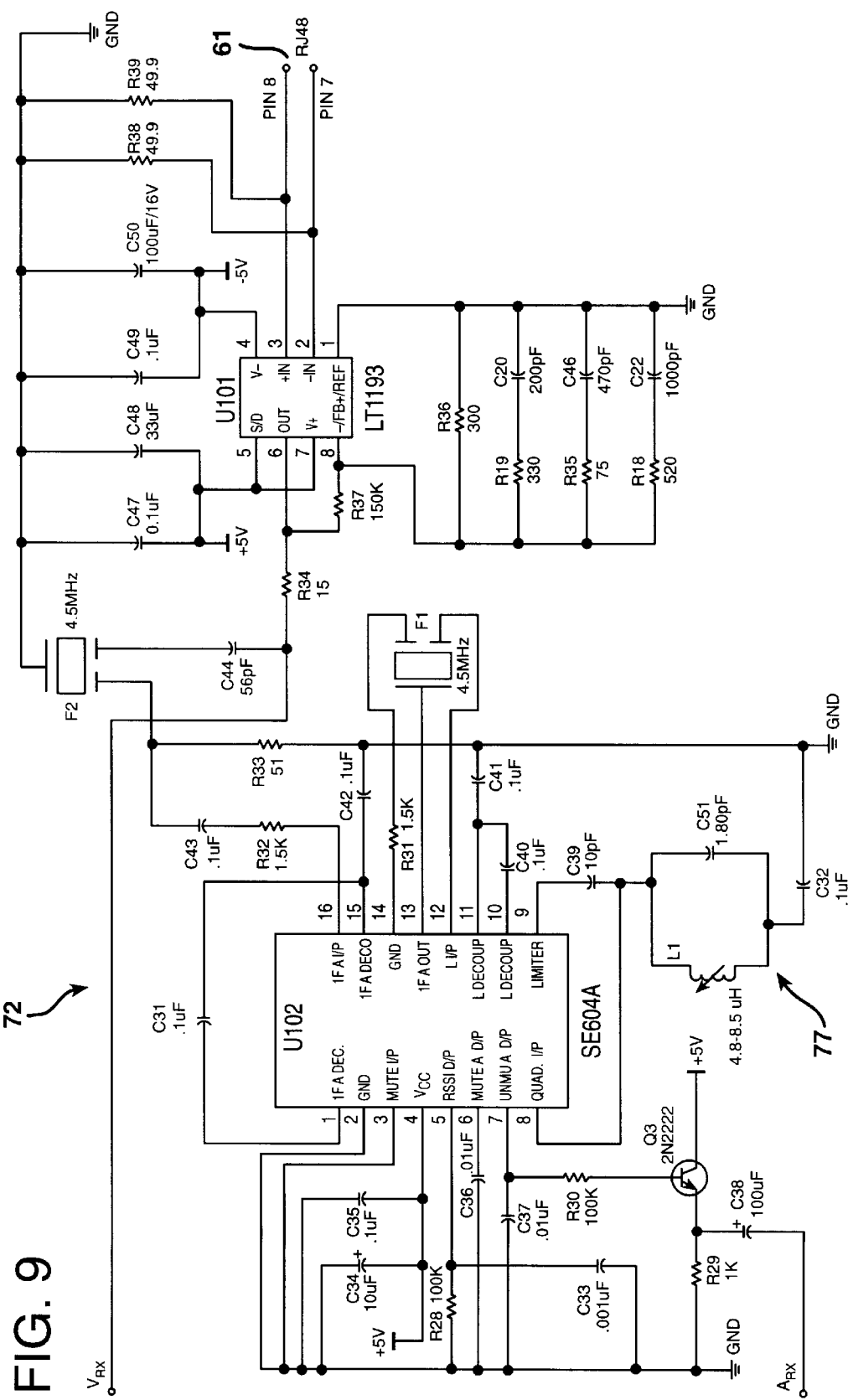
FIG. 9 is a schematic diagram of the receiver shown in FIG. 7.

FIG. 9 illustrates schematically the working components of the receiver 72. A composite differential input video signal from an unshielded, twisted pair of telephone lines is received at pins 7 and 8 of the RJ48 jack input 61 to the receiver 72. These differential signals are passed to pins 2 and 3 of line-length compensation circuit U101 which is an LT1193 IC chip. The line-length compensation chip U101 is set to compensate for the attenuation that occurs in 1000 feet of a twisted pair of telephone wires. The line-length compensation circuit U101 provides nonlinear amplification across the bandwidth of the composite differential signal that appears at pins 7 and 8 and produces a composite, single-ended output signal at pin 6 of line-length compensation circuit U101. This signal is fed to a resistor R34.

The signal from resistor R34 and capacitor C44 is provided as an input to a 4.5 MHz bandpass filter F2. The filter F2 strips the 4.5 MHz sound subcarrier subfrequency from the composite video signal at resistor R34 and directs it to a decoder demodulator circuit U102. In an alternative path from resistor R34 the complete composite video signal is provided as an output VRX to the multiplexer.

The decoder demodulator U102 is an SE604AD IC chip. The decoder demodulator U102 is coupled to a quadrature coil 77 that forms a part of the demodulating circuit. The quadrature coil 77 starts the FM demodulation. Transistor Q3 is provided as a buffer transistor. The output of the decoder demodulator circuit is provided as a 20 Hz to 20 kHz audio signal ARX and passed to the multiplexer 71.

Transmitter 73

Figure 10:
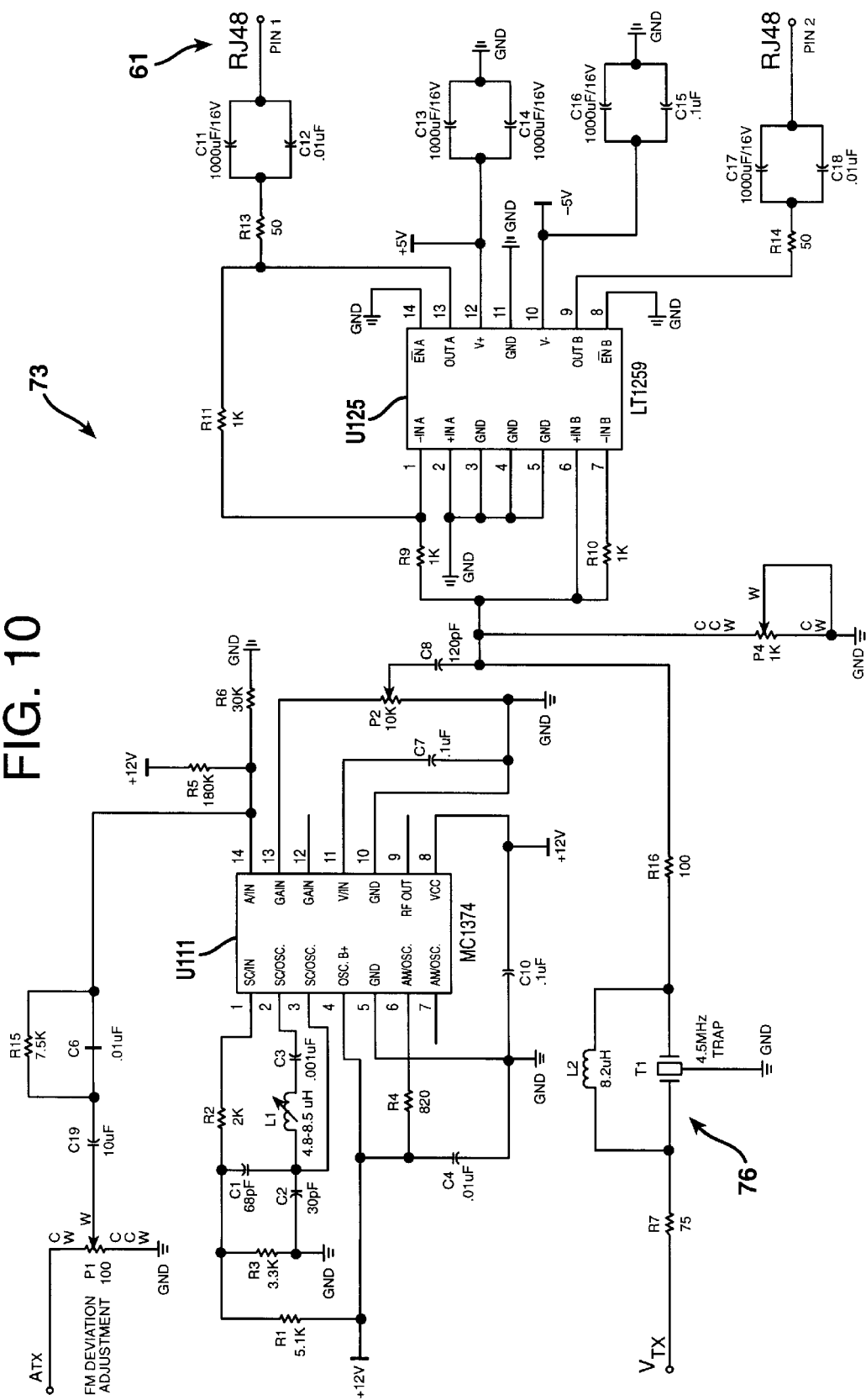
FIG. 10 is a schematic diagram of the transmitter shown in FIG. 7.

FIG. 10 illustrates schematically the transmitter 73. The transmitter 73 receives an audio input ATX and a video input VTX from the multiplexer 71. The video input VTX is passed through a filter 76 that eliminates any frequencies that belong within the 4.5 MHz audio subcarrier frequency range. The video signal is transmitted through resistor R16 to a subcarrier level adjustment, which is a manually set wiper P2. The gain output from pin 13 of the FM modulator circuit U111 is adjusted by wiper P2. The video input to the FM modulator circuit U111 appears at pin 11 thereof. The FM modulator circuit U122 is an MC1374 IC chip. The audio input ATX from the multiplexer 71 arrives at the FM modulator circuit U111 at pin 14 after passing through a variable FM deviation adjustment resistor controlled by another manually set wiper P1.

With the prescribed gain from the manually set wiper P2, the amplified video signal VTX leaves the GAIN pin 13 of FM modulator circuit U111 and is passed to a single-ended to differential signal conversion circuit U125.

The single-ended to differential conversion circuit U125 is an LT1259 IC chip which acts like a switch to convert a single polarity signal into mirror image, positive and negative, output signals which appear at pins 1 and 2 of the RJ48 coupling interface 61.

These differential mode signals are directed through power supply decoupling capacitive circuits which include capacitors C11 through C18. The outputs on pins 1 and 2 from these blocking capacitor circuits are therefore the mirror images of each other across the entire frequency bandwidth, one being positive and one being negative.

DVN300

FIGS. 12 through 18 illustrate an alternative embodiment of a desktop video network unit DVN300 constructed according to the invention. The DVN300 unit includes many of the elements and components depicted and described in conjunction with the DVN100. Elements and components which are common to the DVN100 bear the same reference designations in FIGS. 12 through 18 as in FIGS. 5 through 11, and their function is as described in conjunction with the DVN100. There are some significant differences between the two units, however.

Figure 12:
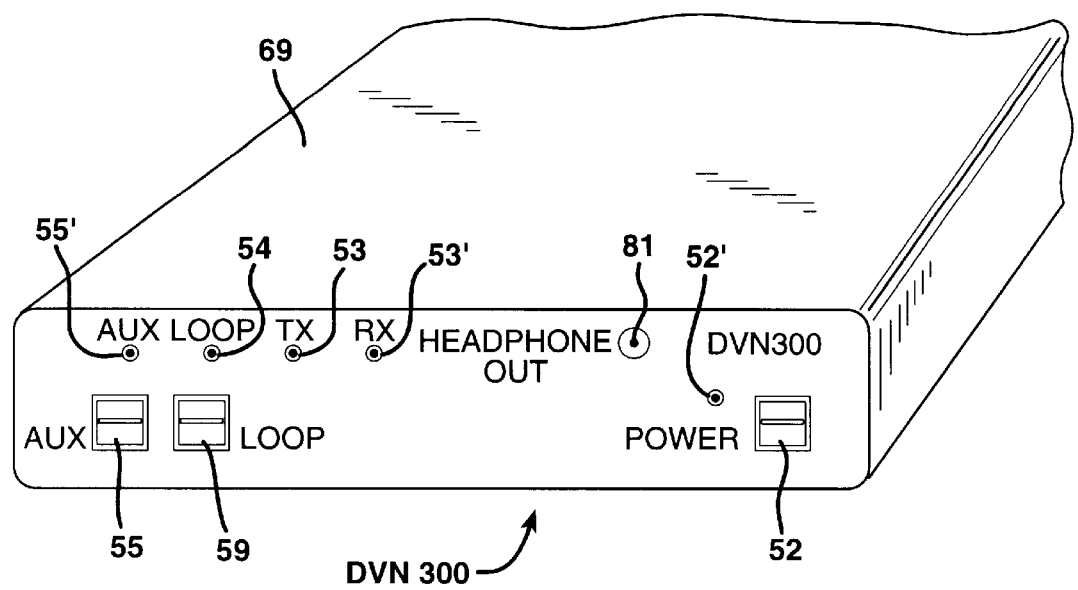
FIG. 12 illustrates the front panel of an alternative embodiment of a desktop video network constructed according to the invention.

The front panel of the DVN300 is illustrated in FIG. 12. In addition to the features depicted and described in conjunction with the DVN100, the DVN300 also includes a headphone output 81. Each user therefore has an option of using the external speakers supplied with both the DVN100 and the DVN300 or a headphone to maintain privacy of reception.

Figure 13:
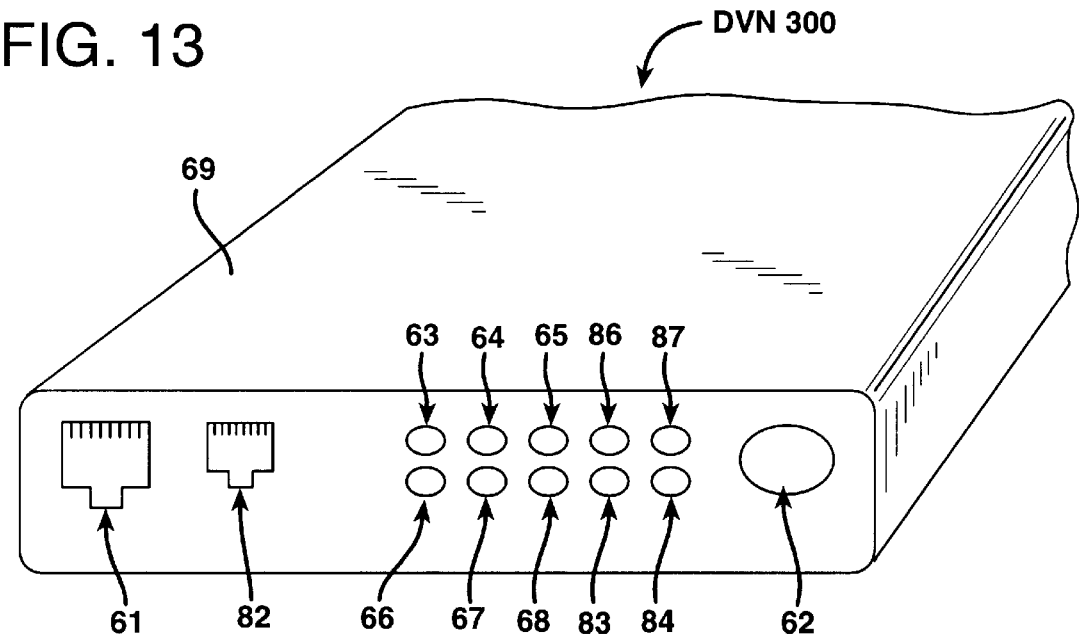
FIG. 13 illustrates the rear panel of the desktop video network of FIG. 12.
Figure 14:
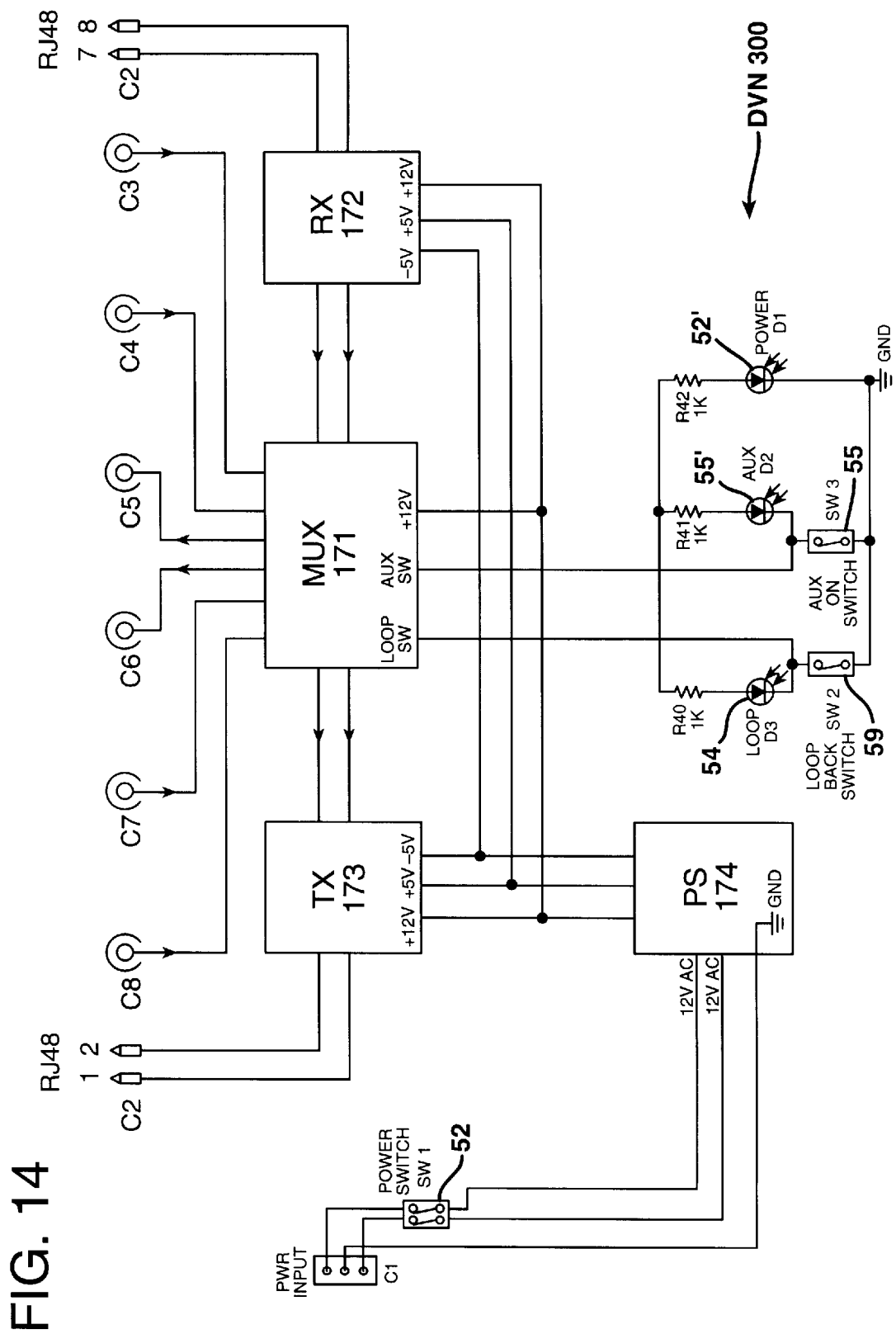
FIG. 14 is a block diagram of the electronic components of the desktop video network of FIGS. 12 and 13.

The rear panel of the DVN300 is shown in FIG. 13. The rear panel of the DVN300 includes a conventional RJ11 telephone interface jack 6P4C indicated at 82. The telephone jack 82 is located alongside the RJ48 jack 61.

The rear panel of the DVN300 also includes a second audio output jack 86, which is an RCA connector jack, and also a second audio input jack 87, likewise an RCA connector jack. The jacks 86 and 87, like the other audio jacks, provide for output and input of 20 Hz–20 kHz, 500 mV, p-p @ −3 dB. The rear panel of the DVN300 additionally includes a second NTSC, PAL, or SECAM color video output 83, which is an RCA connector jack, as well as a second NTSC, PAL, or SECAM color video input 84, which is likewise an RCA connector jack.

Multiplexer 171

Figure 15:
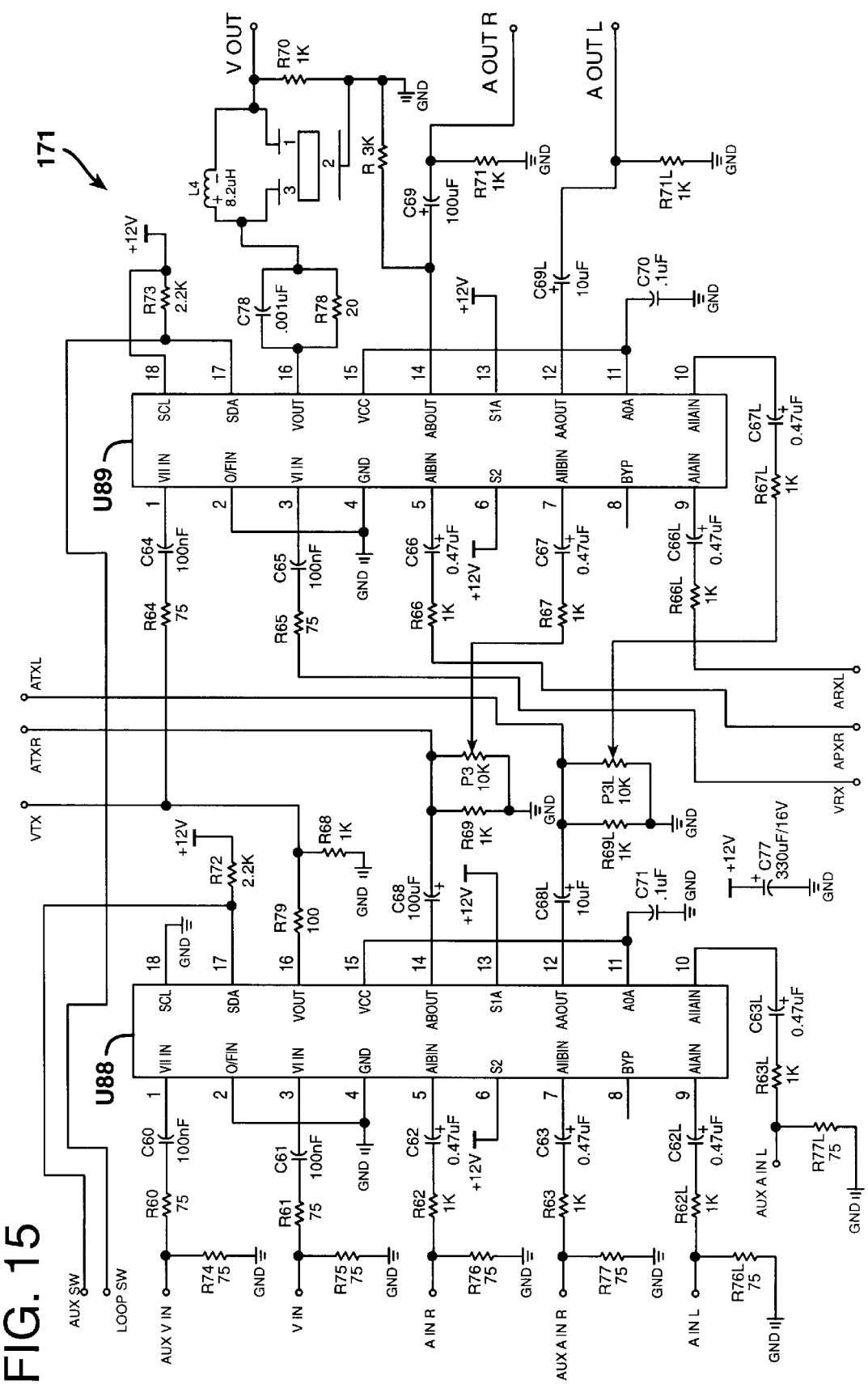
FIG. 15 is a schematic diagram of the multiplexer shown in FIG. 14.

The multiplexer 171 of the DVN300 is illustrated schematically in FIG. 15. Unlike the DVN100, the DVN300 has both left and right audio inputs and both left and right auxiliary audio inputs. The audio and video inputs are directed to circuit U88, which is a TDA8440L IC chip. Like the circuit U5 in the DVN100, the circuit U88 serves as a toggle switch. Toggle switch circuit U88 is triggered by signals on the AUX SW line from the auxiliary switch 55 to gate through audio and video signals from alternative video sources.

An identical IC chip is used as another toggle switch U89 which is connected to the loop-back switch 59 to receive the LOOP SW signal. By activating the loop switch 59 the user can either gate through signals being generated at the user's own station, or signals from a remote location. A filter circuit including capacitor C78, resistor R78, and an inductor L4 clamps the sound carrier going out to the video side of the unit and cleans up the video signal that is passed to the monitor as the V OUT signal. Switch U89 also provides the audio output signal for right and left audio as A OUT R and A OUT L, respectively.

Receiver 172

The receiver 172 of the DVN300 is illustrated in FIG. 17. The received video signals are those signals which have been transmitted over a twisted pair of telephone wires of unknown, different lengths and which enter the DVN300 from the twisted pair of telephone wires at the RJ48 jack coupling 61. It is well known that broadband signals transmitted over a twisted pair of telephone wires suffer nonuniform attenuation across their frequency spectrum. Furthermore, the signals are invariably subjected to distortion from voltage spikes of noise as they pass along the lengths of the twisted pair of telephone wires.

Upon entering the receiver 172 of the DVN300, the incoming signals on pins 1 and 2 of the JR48 jack connection 61 are first directed in to a common-mode rejection transformer 165 to filter out common-mode noise from the signals. The received signals then enter a differential amplifier U135 where they are amplified.

Figure 19:
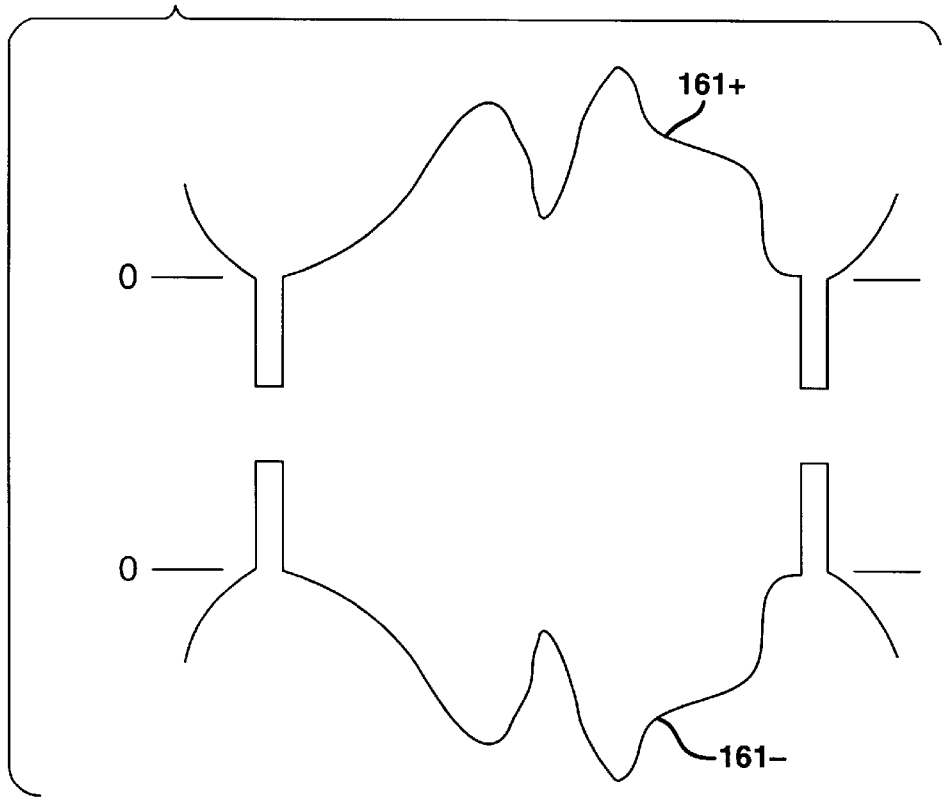
FIG. 19 is a diagram showing a typical wave form of a dual-mode broadband video signal as transmitted.

FIG. 19 illustrates an exemplary wave form of an ideal differential video signal. This signal has a positive component labeled 161+ and a negative component labeled 161−. The signals 161+ and 161− may be considered to be the true and undistorted video signals that are to be passed out onto the twisted pair of wires. It is therefore important for these signals to be as pure and undistorted as possible prior to leaving the transmitter 173.

Figure 20:
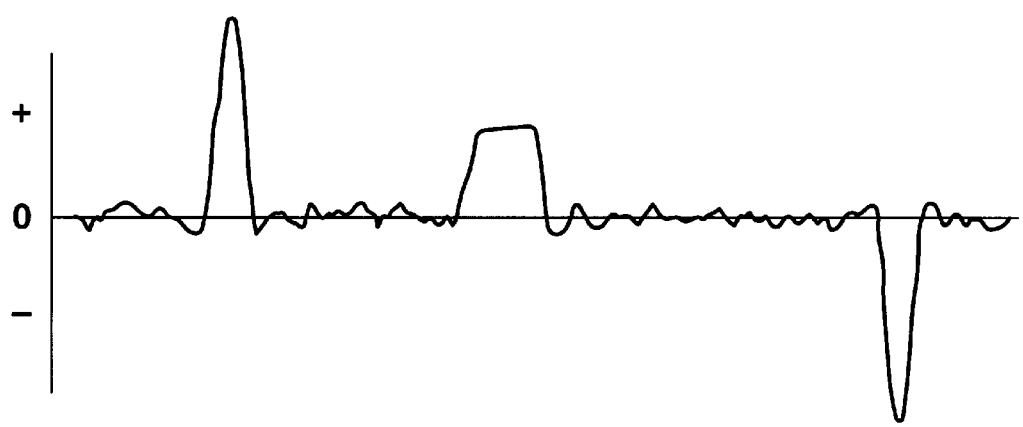
FIG. 20 is a diagram showing typical noise signals that are impressed on broadband video signals that are transmitted on twisted pairs of telephone wires.
Figure 21:
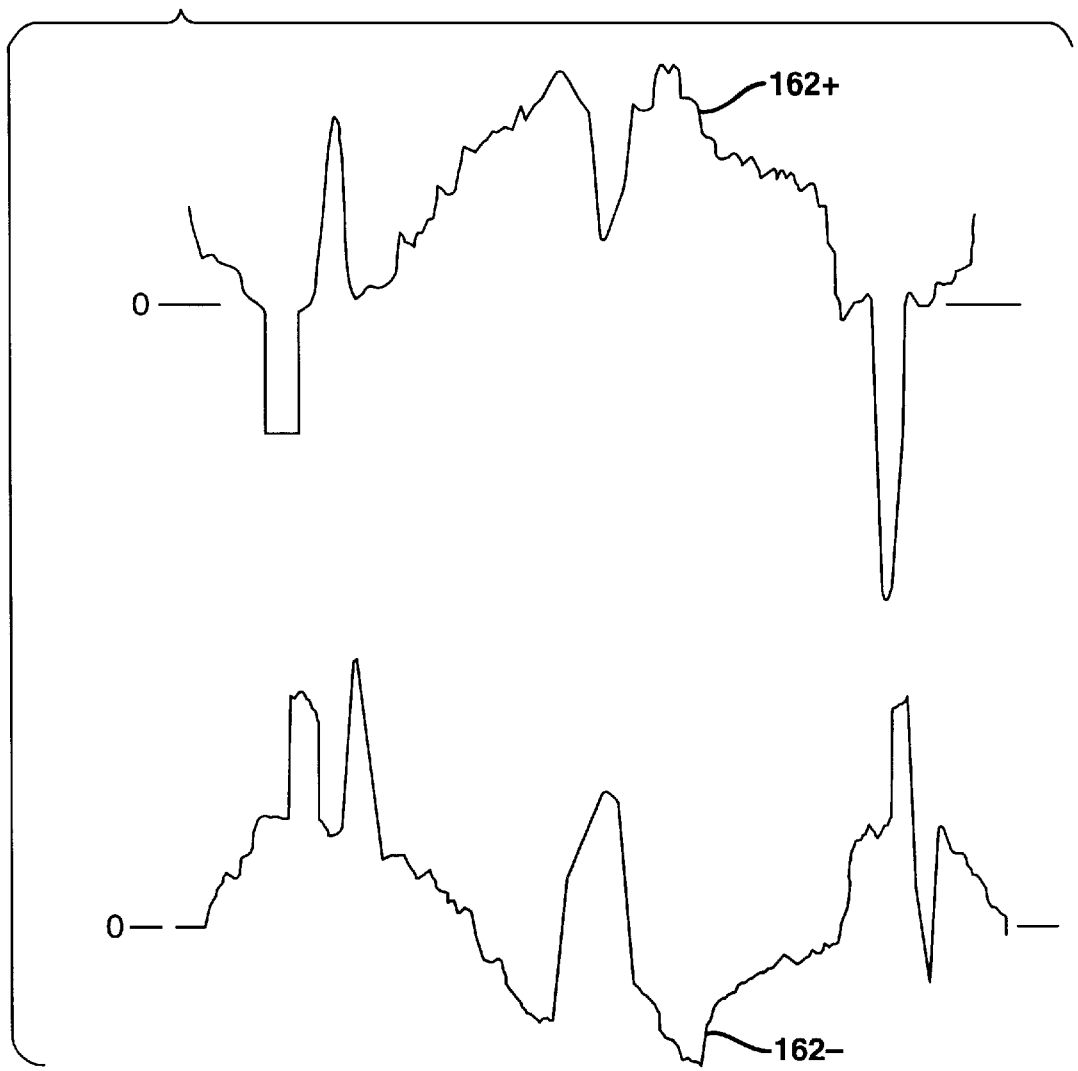
FIG. 21 is a diagram showing a degraded video signal in which the common-mode noise signals of FIG. 20 are impressed on the dual-mode broadband signals of FIG. 19.

However, in the processing of the signals and their passage through a pair of twisted telephone wires, various aberrations of pulses of the type depicted in exaggerated form in FIG. 20 are impressed upon the both of the signals 161+ and 161−. When this occurs these spikes of noise distort the signals 161+ and 161− to a distorted form shown at 162+ and 162− in FIG. 21. The signals 162+ and 162− are therefore severely degraded when they reach the receiver 172.

To remedy the noise introduced into the broadband signals 161+ and 161− by the noise spikes of FIG. 20, the common-mode rejection transformer 165 detects spikes in the signals 162+ and 162− that are of the same polarity, and removes these voltage spikes. As a result, the actual output signals that appear at pins 1 and 2 of the differential amplifier U135 are virtually identical, mirror image versions of the pure signals 161+ and 161− of FIG. 19, although at this point they are attenuated nonuniformly across their spectra.

By employing a common-mode, rejection transformer 165 to detect and eliminate noise spikes from the differential inputs of the broadband signal in the differential mode, the differential signals transmitted as inputs from the twisted pair of telephone wires very accurately represent only the true video signals as transmitted with noise generated in the connecting pair of twisted telephone wires eliminated therefrom.

From the differential amplifier U135 the received, broadband signal is directed to a second common rejection transformer 167 to further remove common-mode noise which has now been amplified along with the desired broadband signal.

The differential signals from the differential amplifier 135 are then passed as inputs on lines 141 to preset compensating circuits U136 and U138. Although the signals on lines 141 have been filtered of externally induced noise, they are still in a degraded condition due to the nonuniform attenuation across the broadband spectrum that occurs when broadband signals are transmitted over twisted pairs of telephone wires.

Compensation circuits U136 and U138 are both LT1193L IC circuit chips. Chip U136 is preset to introduce a gain into signals received by it to compensate for passage of those signals through a length of 3000 feet of a twisted pair of telephone wires. That is, the extent of attenuation across the spectrum of a broadband signal for the different frequency components of that signal is quite predictable. Compensating circuit U136 acts upon signals received to reconstruct those signals, taking into account the varying extent of attenuation that occurs in those signals across the broadband spectrum.

An identical compensation circuit chip U138 is preset to compensate for transmission of a broadband signal through zero feet of a twisted pair of telephone wires. That is, compensation circuit chip U138 treats incoming signals as not being attenuated by passage through a twisted pair of telephone wires.

The outputs of the compensation circuits U136 and U138 appear respectively on lines 142 and 143 as single-ended signals. The signal on line 142 is compensated for passage through 3000 feet of a pair of twisted telephone wires, while no such compensation has been introduced into the signal on line 143.

The signal on line 142 is directed as an input to a measuring circuit that includes a signal strength measuring chip U134. The entire measuring circuit is designated BOXII. The signal from line 142 is also directed to an identical measuring circuit indicated as REPEAT BOXII. The measuring circuits BOXII and REPEAT BOXII are respectively employed to measure the strength of the incoming signal for use in regenerating the right and left audio signals, as well as the video signal.

The measuring circuit chip U134 in BOXII compares the strength of the amplified, single-ended signal, compensated for passage through 3000 feet of a pair of twisted wires, and compares the strength of that signal with the known strength of signals generated by the transmitter unit 173. Based upon this comparison between the proportionality of the known transmitted signal strength and the strength of the signal compensated for passage through 3000 feet of a pair of twisted wires, the system can automatically determine the actual length of the pair of twisted wires through which the signal actually did travel. That is, if the broadband signal actually did pass through 3000 feet of a pair of twisted telephone wires, the signal on line 142, which has already been amplified, will equal the strength of the transmitted signal, as stored in the measuring circuit U134. Conversely, the more by which the strength of the signal on line 142 exceeds the stored signal strength, the shorter the distance of the twisted pair through which the signal travelled to reach pins 1 and 2 of the RJ48 jack coupling 61.

The measuring chip U134 provides an output on line 144 that represents the fractional amount of the computed length of the pair of twisted wires to a length of 3000 feet. This signal is provided as an input on pin 2, which is the negative input to a DC amplifier U132. The DC amplifier U132 provides a control signal as an output on line 145 to a mixing circuit 131. The mixing circuit U131 mixes the inputs from the compensating circuits U136 and U138 in proportion to the computed length of the pair of twisted wires to a length of 3000 feet as determined by the measuring circuit U134. The greater the computed length of the twisted pair, the greater will be the contribution of the signal from line 142 to the VIDEO OUT signal on line 146. Conversely, the shorter the length that has been calculated by measuring circuit U134, the greater will be the contribution of the signal from line 143 to the video OUT signal on line 146. The relative mixing of the signals on lines 142 and 143 is directly proportional to the computed length of the twisted pair of wires connected to pins 1 and 2 of the RJ48 jack coupling 61.

Figure 22:
FIG. 22 shows the signal of FIG. 21 treated to reject the common-mode rejection signals that appear thereon.
Figure 23:
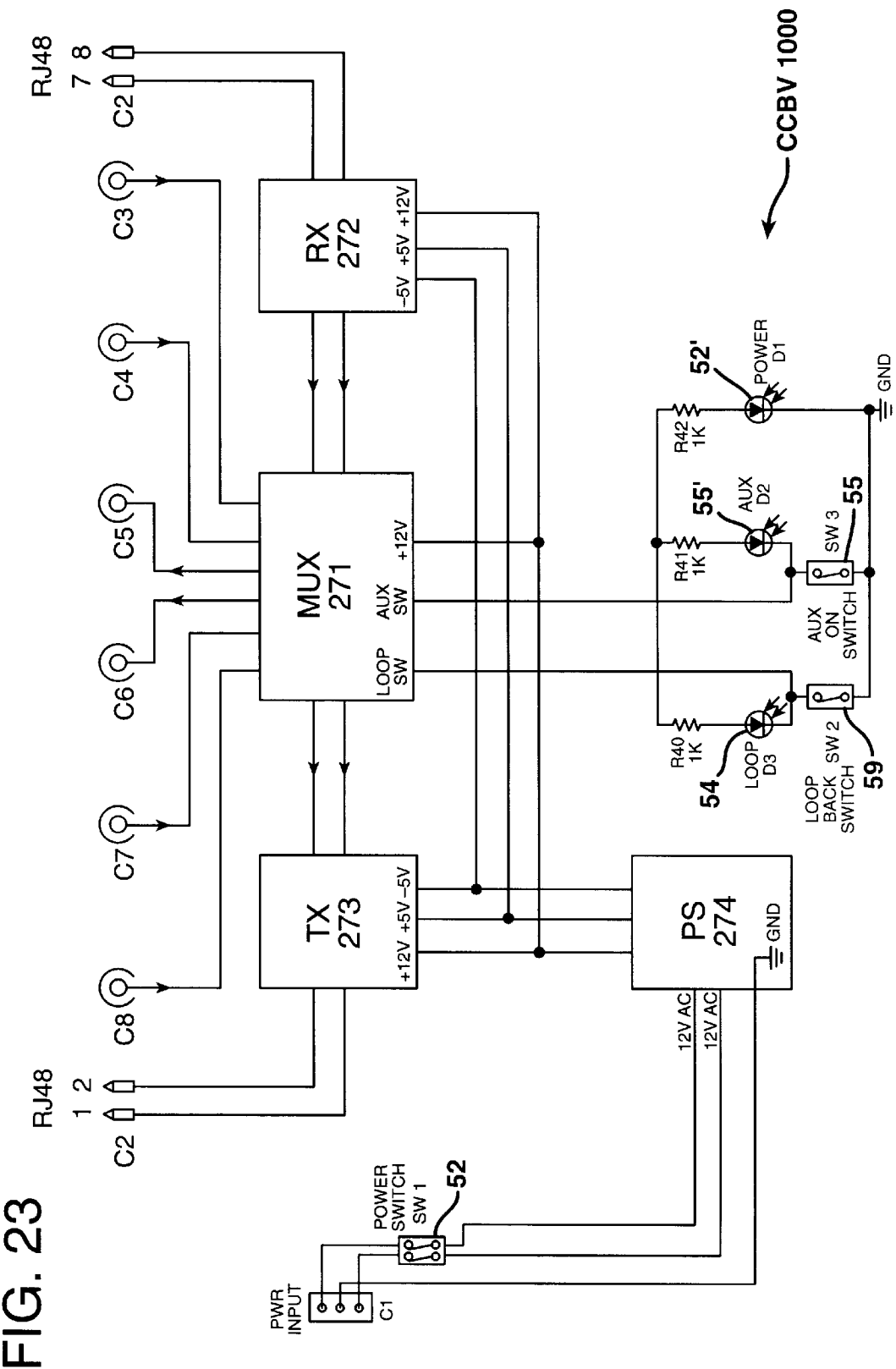
FIG. 23 is a block diagram of the electronic components of a professional broadcast quality, broadband, video network unit constructed according to the invention.

The video output to the multiplexer is transmitted as a signal VRX to the multiplexer 171 of the DVN300. The restored video signal VRX that appears on line 146 at the output of the mixing circuit U131 is virtually free of transmission noise and amplified to compensate for the nonuniform attenuation resulting from transmission through the twisted pair of telephone wires. This signal is illustrated in FIG. 22. As is evident, the signal VRX is a single-ended signal that is virtually identical in wave form across its spectrum to the dual-mode signals 161+ and 161− of FIG. 19 that were originally transmitted. The signal VRX is a very accurate reconstruction of the broadband video signal that was originally generated and transmitted. The audio signals ARXR for the right audio is derived from an audio amplifier U137 in the circuitry of BOXII. The right audio signal ARXR that appears at line 147 is transmitted as the right audio signal to the multiplexer 171. Similarly, a left audio signal ARXL is produced from another, identical audio amplifier U137 in the circuitry of REPEAT BOXII, and appears on line 148. The left audio signal ARXL on line 148 is transmitted as the left audio input signal to the multiplexer 171 of FIG. 15.

Transmitter 173

Figure 16:
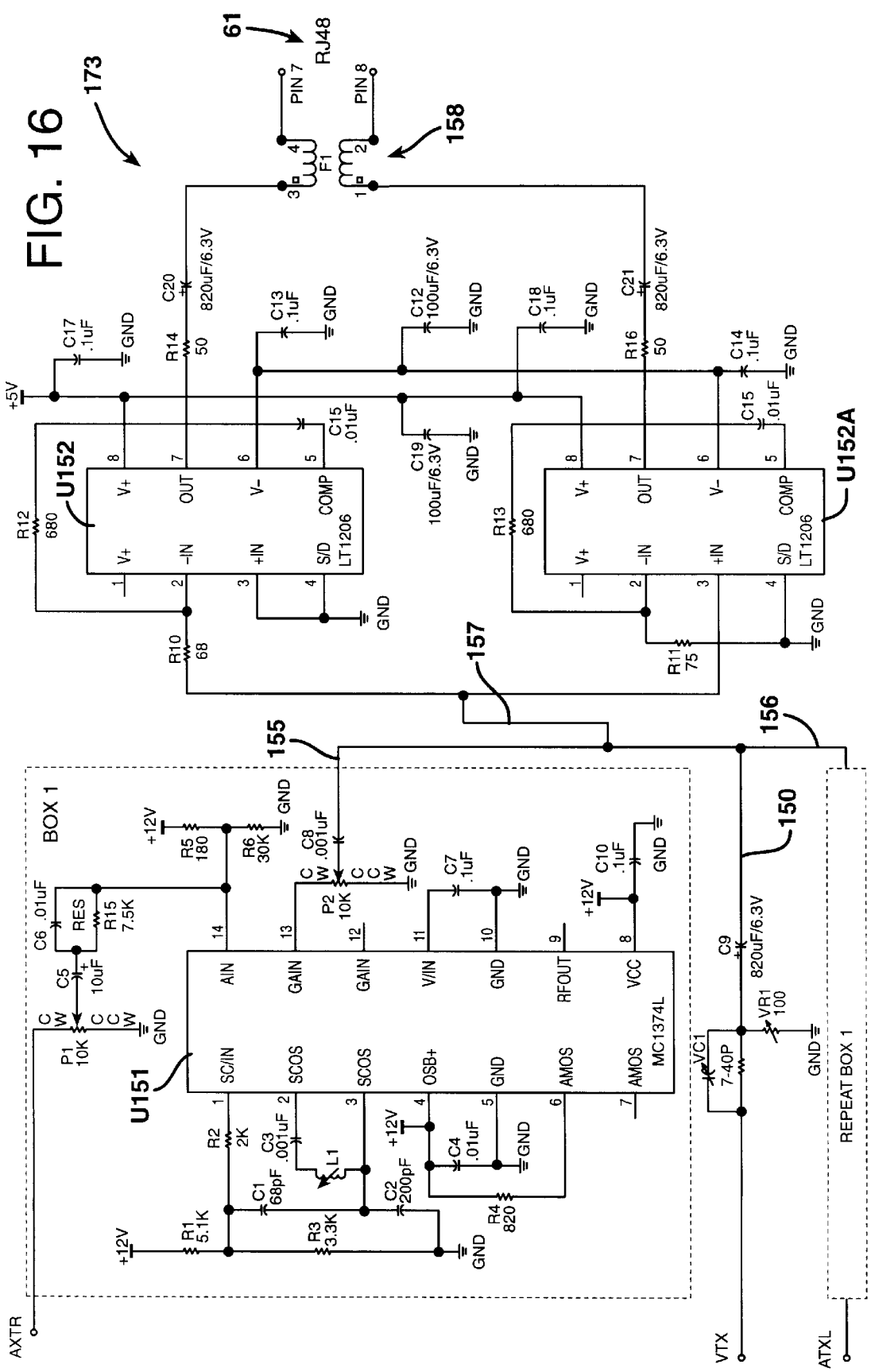
FIG. 16 is a schematic diagram of the transmitter shown in FIG. 14.
Figure 18:
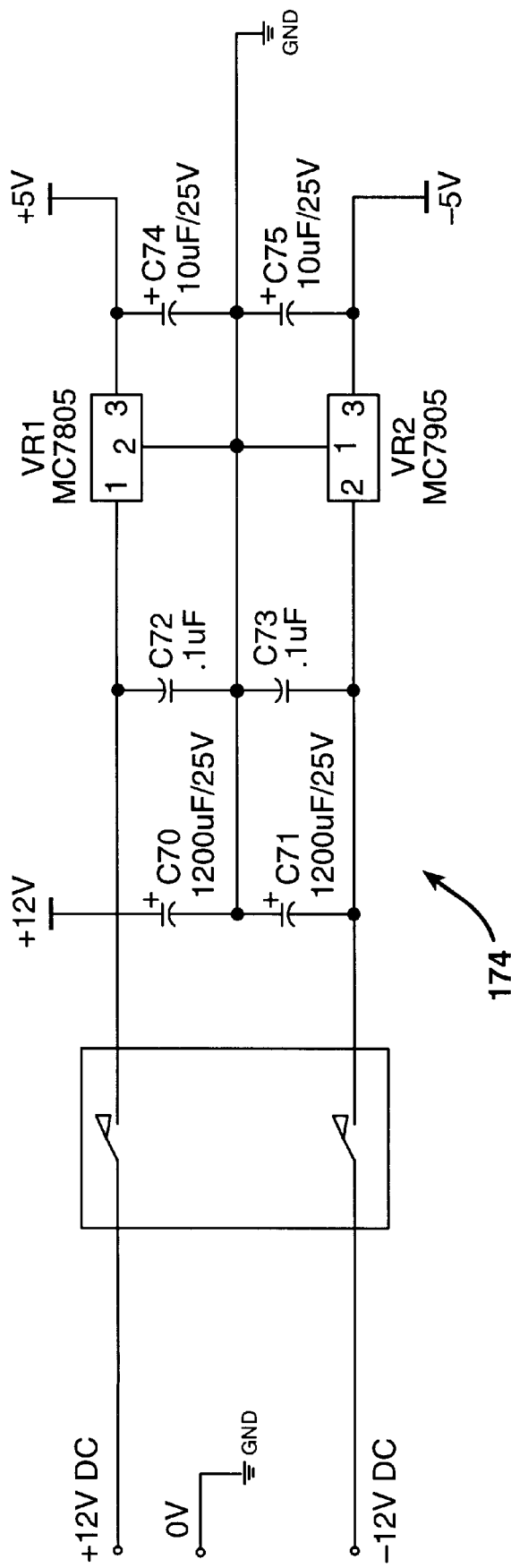
FIG. 18 is a schematic diagram of the power supply shown in FIG. 14.

The transmitter 173 of the DVN300 is illustrated schematically in FIG. 16. The incoming video signal VTX on line 150 from the multiplexer 171 is directed through a precompensation circuit network including a variable capacitor VC1, a resistor R9, and a variable resistor VR1. The signal on line 150 is directed to two different FM modulating circuits which are labeled BOX1 and REPEAT BOX1, respectively. The FM modulating circuits BOX1 and REPEAT BOX1 respectively modulate the right audio signal ATXR and the left audio signal ATXL from the multiplexer 171. The electrical components within REPEAT BOX1 are identical to those in BOX1 and are therefore not illustrated schematically. The signals from line 150 are respectively provided to the FM modulator circuits BOX1 and REPEAT BOX1 on lines 155 and 156. The FM modulating chips U151 in both BOX1 and REPEAT BOX1 are the same type of IC chips and perform the same function as the FM modulating chip U111 in the DVN100, depicted in FIG. 10.

The output of the FM modulator circuits BOX1 and REPEAT BOX1 are combined on line 157 and directed to the negative and positive inputs respectively of single-ended to differential conversion circuit chips U152 and U152A. These chips are both LT1206 IC chips and provide higher power output drivers than the single conversion chip U125 in the DVN100.

The outputs of conversion chips U152 and U152A are directed to another common-mode rejection transformer 158, which is not employed in the DVN100. The common-mode outputs from conversion circuit chips U152 and U152A are of opposite polarity, but are derived from a common, single-ended, input signal. Therefore, the signals appearing at pins 7 and 8 of the RJ48 modular phone jack of the DVN300 unit should be of identical wave shape, but opposite in polarity. The common-mode rejection transformer 158, like the common-mode rejection transformers 165 and 167 in the receiver 172, serves to remove any signal components of the same polarity which appear in both of the incoming signals from the signals received from conversion chips U152 and U152A. That is, the signals in the system are constantly subjected to minor, unpredictable aberrations which manifest themselves equally and in the same polarity in both signals even before being transmitted over a twisted pair of telephone wires. Therefore, it is highly desirable to provide the transmitter with a common-mode, rejection transformer 158 at its output to ensure that the broadband video signal leaving the transmitter 173 is virtually free of common-mode noise.

From the circuitry of FIGS. 16 and 17 it is evident that the DVN300 includes several very important features that are not present in the DVN100. Specifically, the DVN300 processes the broadband video signal so as to filter out common-mode noise from the broadband video signal when those signals are in the differential mode. This very effectively removes contributions to the broadband video signals provided by noise spikes of the type depicted in FIG. 21. As a result, the effects of extraneous noise, both in the processing circuitry of the DVN300 and also in the twisted pairs of wire through which signals to the DVN300 travel, are minimized.

Another major feature of the DVN300 is the automatic calculation of the length of the twisted pair of wires through which the signal has passed to reach the DVN300 unit. Unlike the DVN100, and the prior system of U.S. Pat. No. 5,183,637, the DVN300 does not have to be provided with compensating circuitry that is specific to a particular length of a pair of twisted telephone wires. To the contrary, based upon a comparison of the signal strength received, which is compared to the known strength of a broadband signal transmitted by the DVN300, the system of the DVN300 compensates for nonuniform attenuation across the broadband spectrum in the signal travelling through twisted pairs of telephone wires that may vary considerably in length.

Thus, while the length of the twisted pairs connecting each of the stations S1A through S1P and S2A through S2P is normally established at a given length, such as 1000 feet, so that customized circuitry in each unit of the DVN100 is not necessary, the stations in systems employing the DVN300 can be connected to the video server through differing, unknown lengths of pairs of twisted telephone wires. The measuring and mixing circuitry of the receiver 172 of the DVN300 compensates for the signal degradation that occurs in the twisted pair of telephone wires, regardless of the length of those wires as long as that length is within the limits of the system.

CCBV1000

Still another advanced embodiment of a desktop video network is illustrated in FIGS. 23 through 27, and is designated as a CCBV1000 unit. The CCBV1000 allows broadcast-quality video signals to be transmitted and received with remedial compensation for degradation resulting from transmission over twisted pairs of telephone wires. The fundamental difference between the CCBV1000 and the DVN100 and DVN300 desktop video network units is that the CCBV1000 is capable of transmitting and receiving broadband signals of more 10 MHz.

Figure 24:
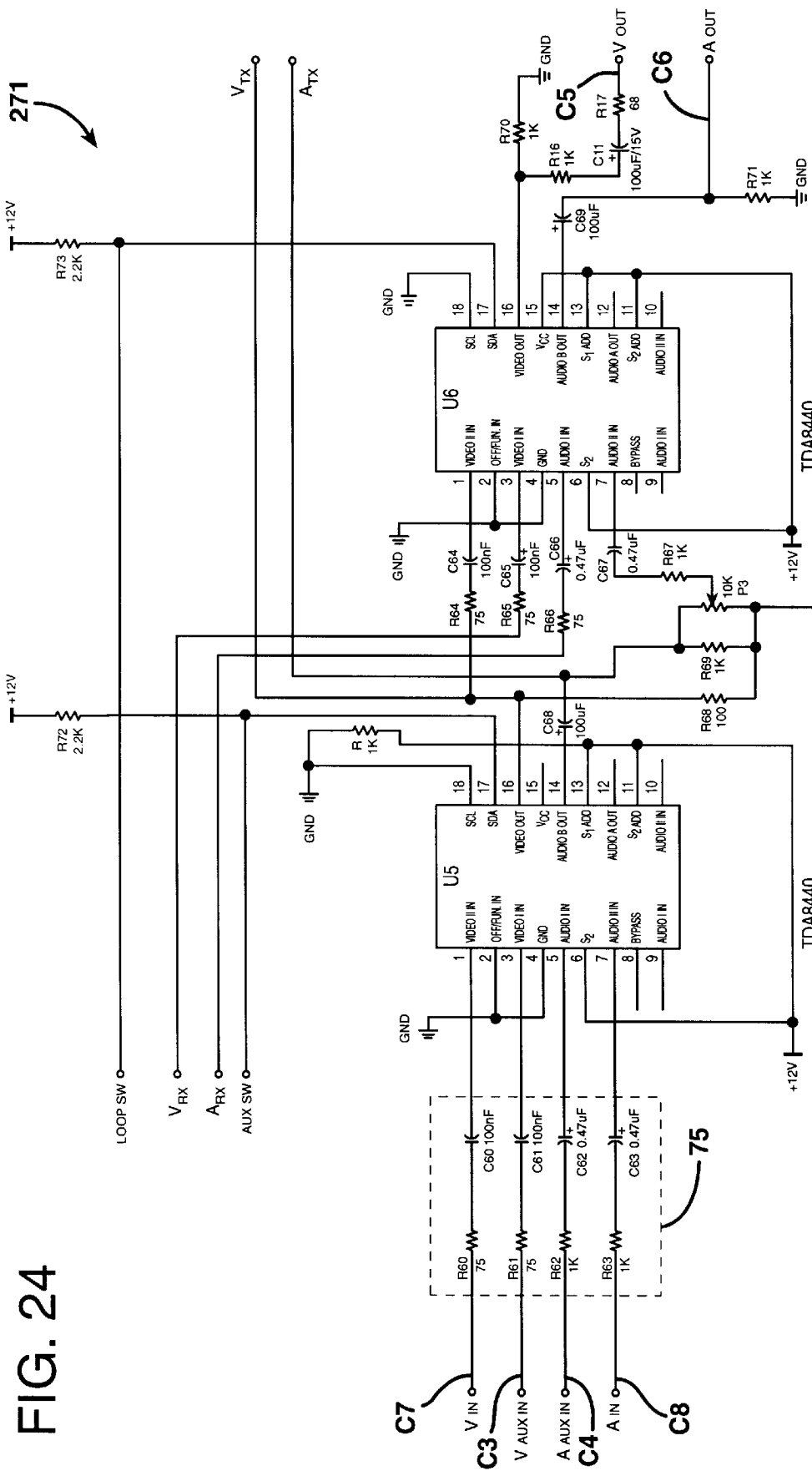
FIG. 24 is a schematic diagram of the multiplexer shown in FIG. 23.

The CCBV1000 is illustrated schematically in FIGS. 24 through 27. Many of the components of the CCBV1000 are the same as those employed in either or both the DVN100 and DVN300. Corresponding components of the CCBV1000 that appear in the other embodiments of the invention already described are identified by the same reference designations. The multiplexer 271 of the CCBV1000 is illustrated in FIG. 24 and is quite similar to the multiplex 71 of the DVN100.

Figure 26:
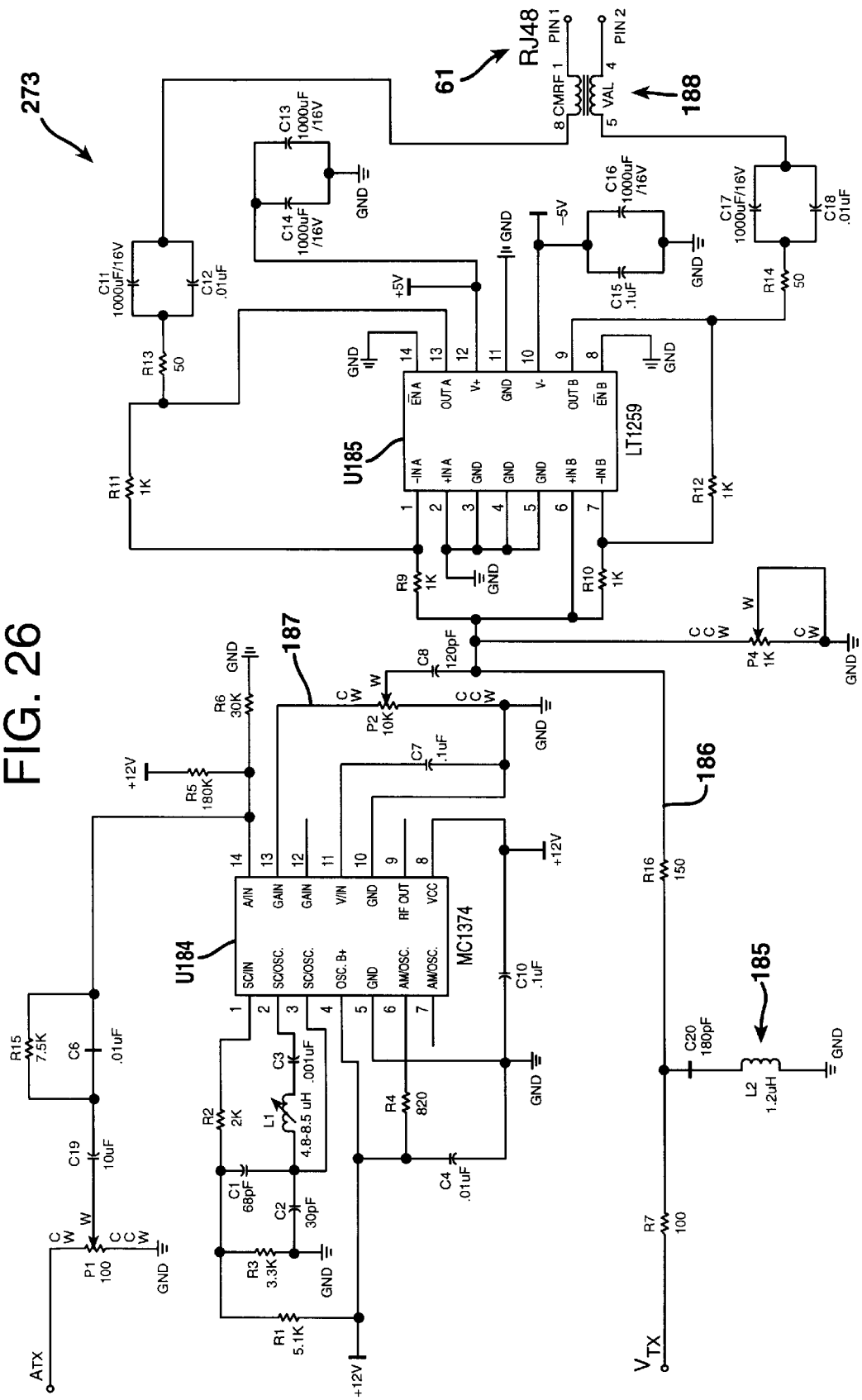
FIG. 26 is a schematic diagram of the transmitter shown in FIG. 23.

The transmitter 273 of the CCBV1000 is illustrated schematically in FIG. 26. The audio signal ATX is passed through an FM modulator circuit U184 that modulates the audio signal to 10.7 MHz frequency. The modulator circuit U184 is an MC13741 IC chip. The output of the modulator circuit U184 appears on line 187, where it is combined with the VTX video signal on line 186. The 10.7 MHz broadband signal including both the video component from line 186 and the audio component from line 187 is passed to a single-ended to differential convertor circuit U185. The convertor circuit U185 converts the inputs on pins 1, 6, and 7 thereof to dual outputs indicated as OUTA and OUTB.

The output signals from convertor U185 are directed to a common-mode rejection filter 188 and then passed to pins 1 and 2 of the RJ48 jack connection 61. The common-mode rejection filter 188 performs tha same function as the common-mode rejection filter 158 of the DVN300, described in conjunction with FIG. 16. However, the common mode rejection filter 188 is operable over the much broader frequency spectrum being transmitted from the CCBV1000.

Figure 25:
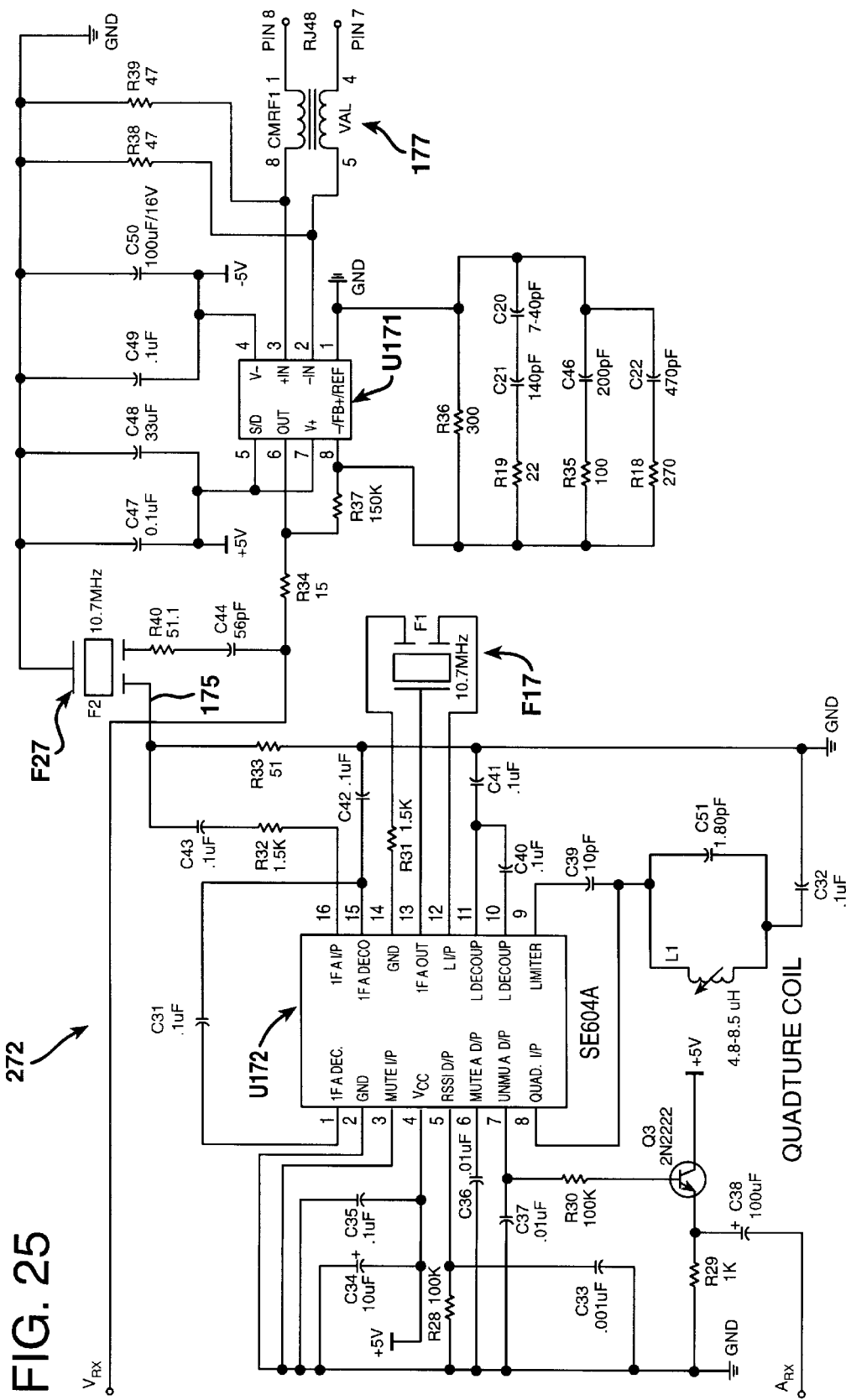
FIG. 25 is a schematic diagram of the receiver shown in FIG. 23.

The receiver 272 of the CCBV1000 is depicted schematically in FIG. 25. The receiver of the CCBV1000 has many of the same operating components and operates in much the same manner as the receiver 72 of the DVN100. However, there are several major differences.

The bandpass filter F27 of the CCBV1000 is set to filter frequencies of 10.7 MHz, rather than 4.5 MHz as in the DVN100. The 10.7 MHz signal appears on line 175, which is coupled as an input to the decoder, demodulator circuit U172. Likewise, a band-pass filter circuit F17 in the receiver 272 is also tuned to a frequency of 10.7 MHz.

Pins 7 and 8 of the RJ48 jack connection 61 of the receiver 272 of the CCBV1000 are not connected directly to the line-length compensation circuit chip U171. Rather, the received signals are first filtered through a common-mode rejection filter 177. The common-mode rejection filter 177 performs the same function as the common-mode rejection circuit 165 of the DVN300, described in conjunction with FIGS. 17 and 19 through 22. However, the common-mode rejection filter 177 is capable of operation over the much broader bandwidth utilized by the CCBV1000.

Figure 11:
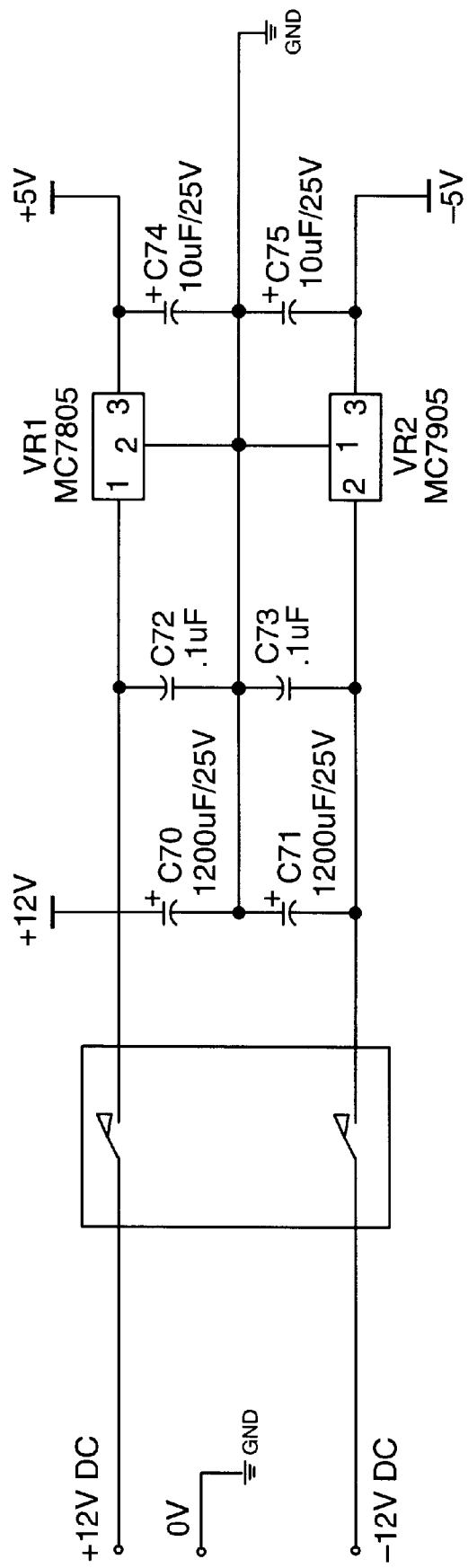
FIG. 11 is a schematic diagram of the power supply shown in FIG. 7.
Figure 27:
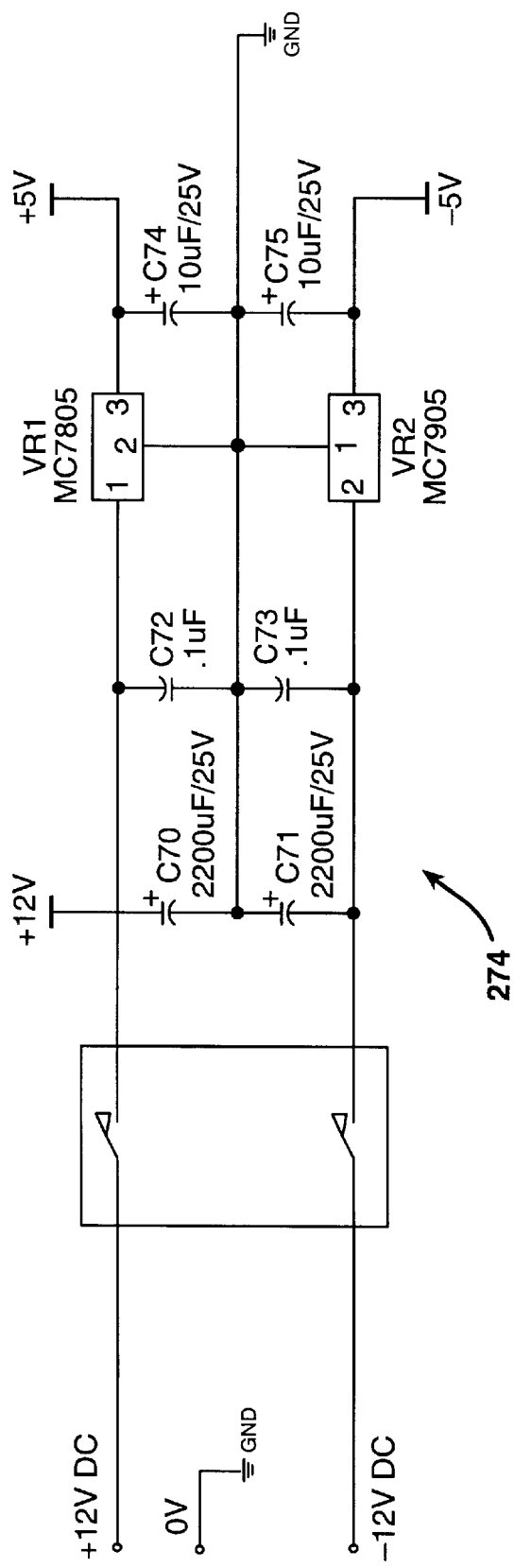
FIG. 27 is a schematic diagram of the power supply shown in FIG. 23.
Figure 28:
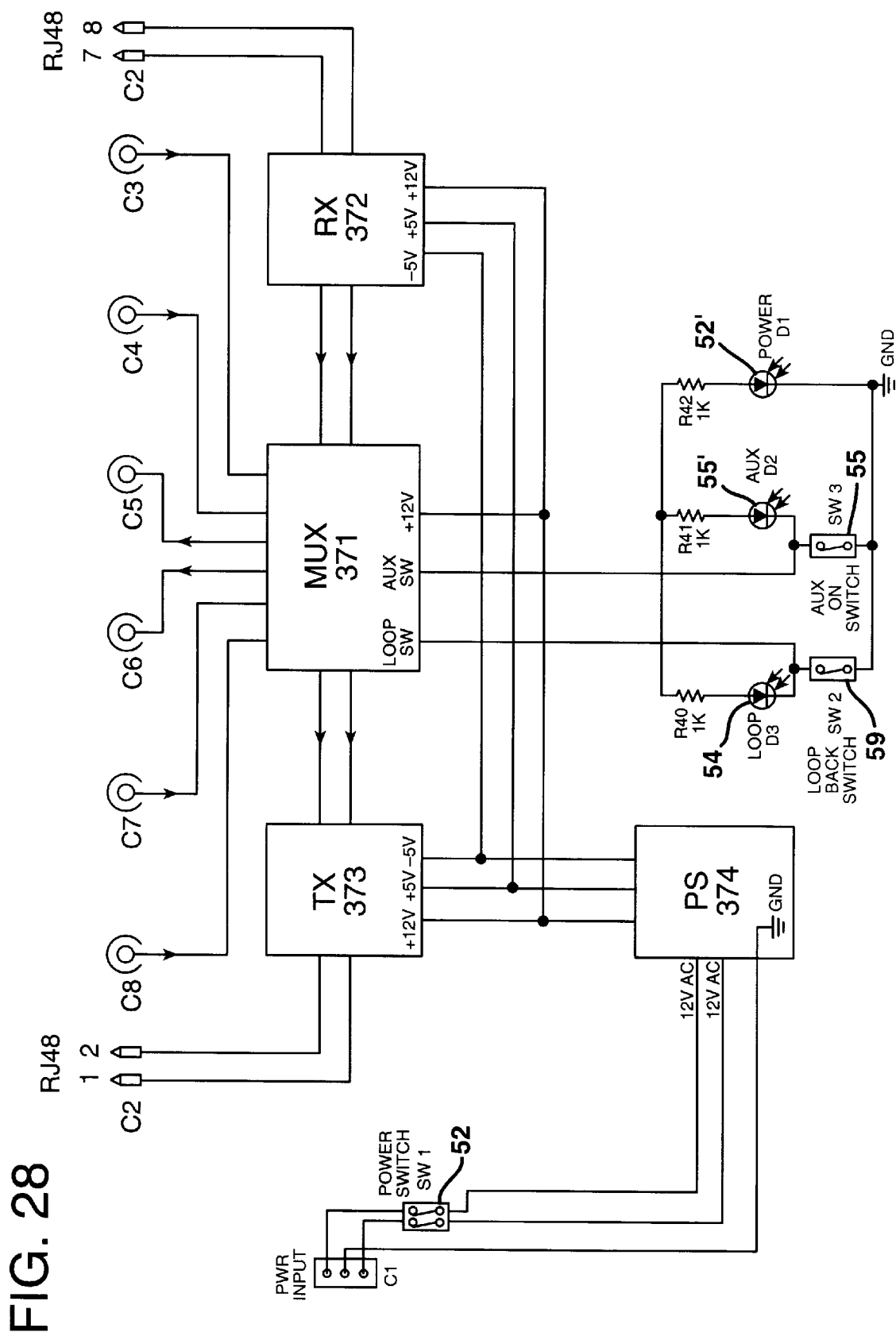
FIG. 28 is a system block diagram of a more sophisticated, broadcast quality, broadband network unit constructed according to the invention.
Figure 29:
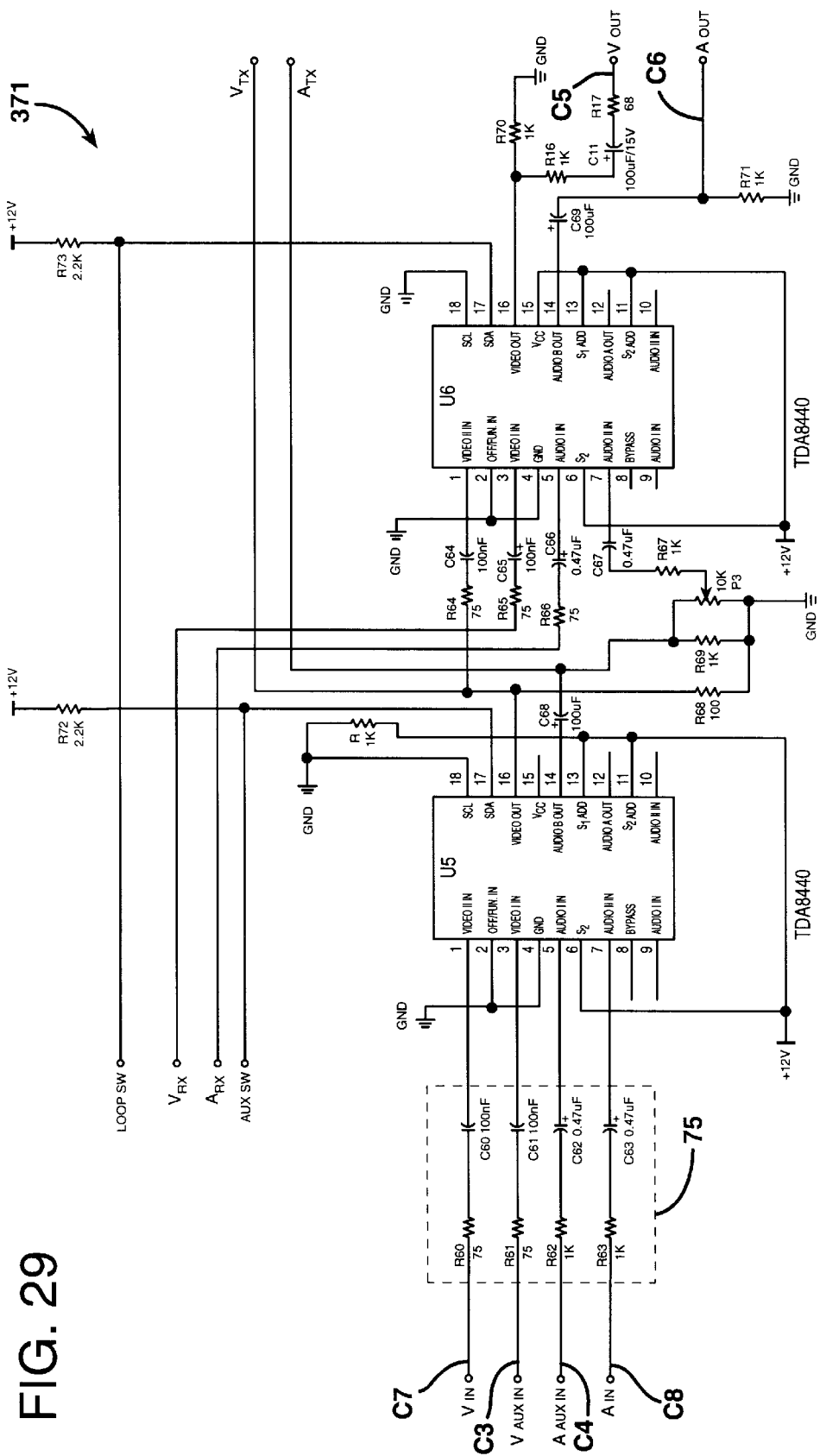
FIG. 29 is a schematic diagram of the multiplexer shown in FIG. 28.

The power supply for the CCBV1000 is illustrated in FIG. 27 and is very similar to the power supply for the DVN100 shown in FIGS. 7 and 11.

CCBV2000

Figure 30:
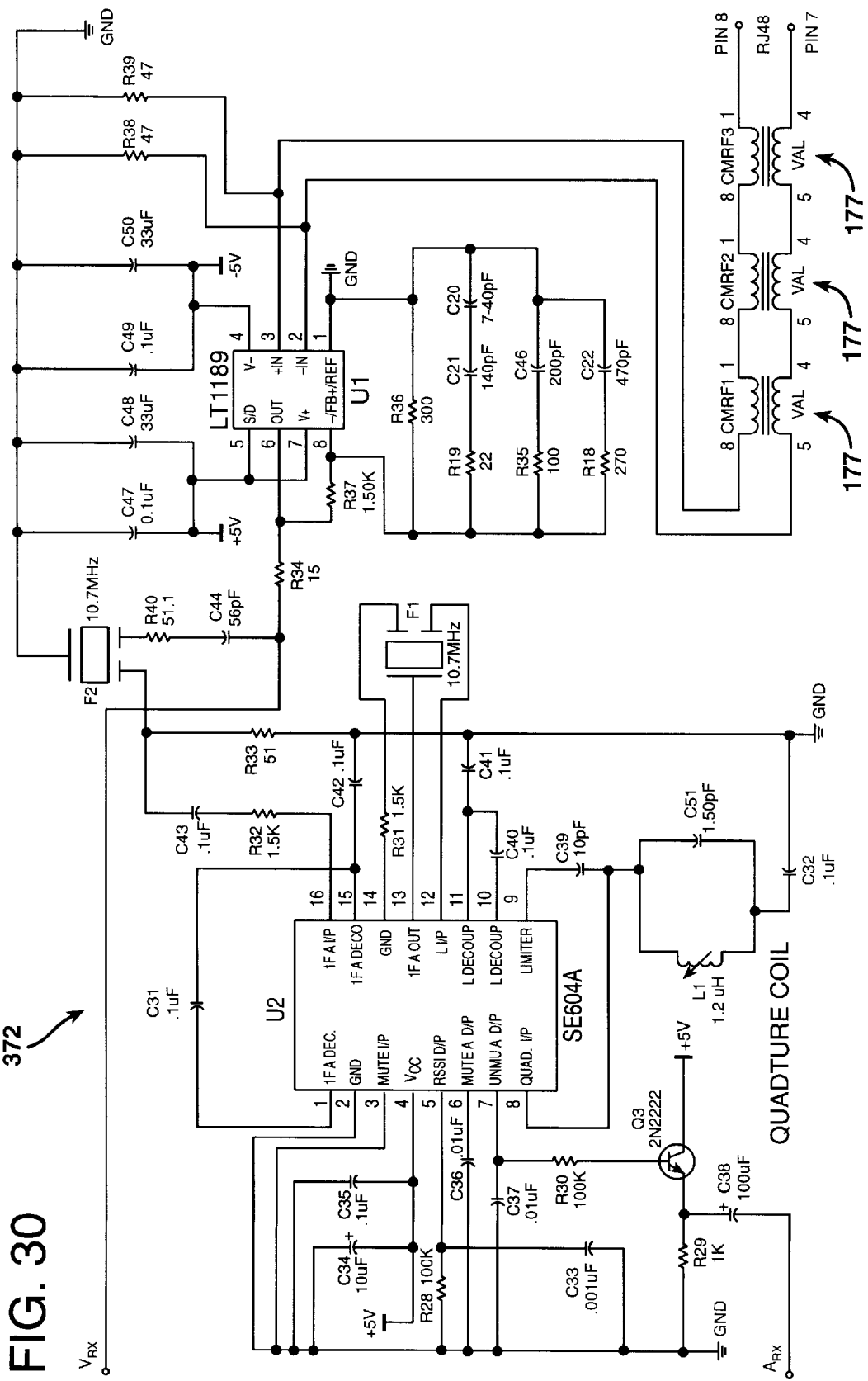
FIG. 30 is a schematic diagram of the receiver shown in FIG. 28.
Figure 31:
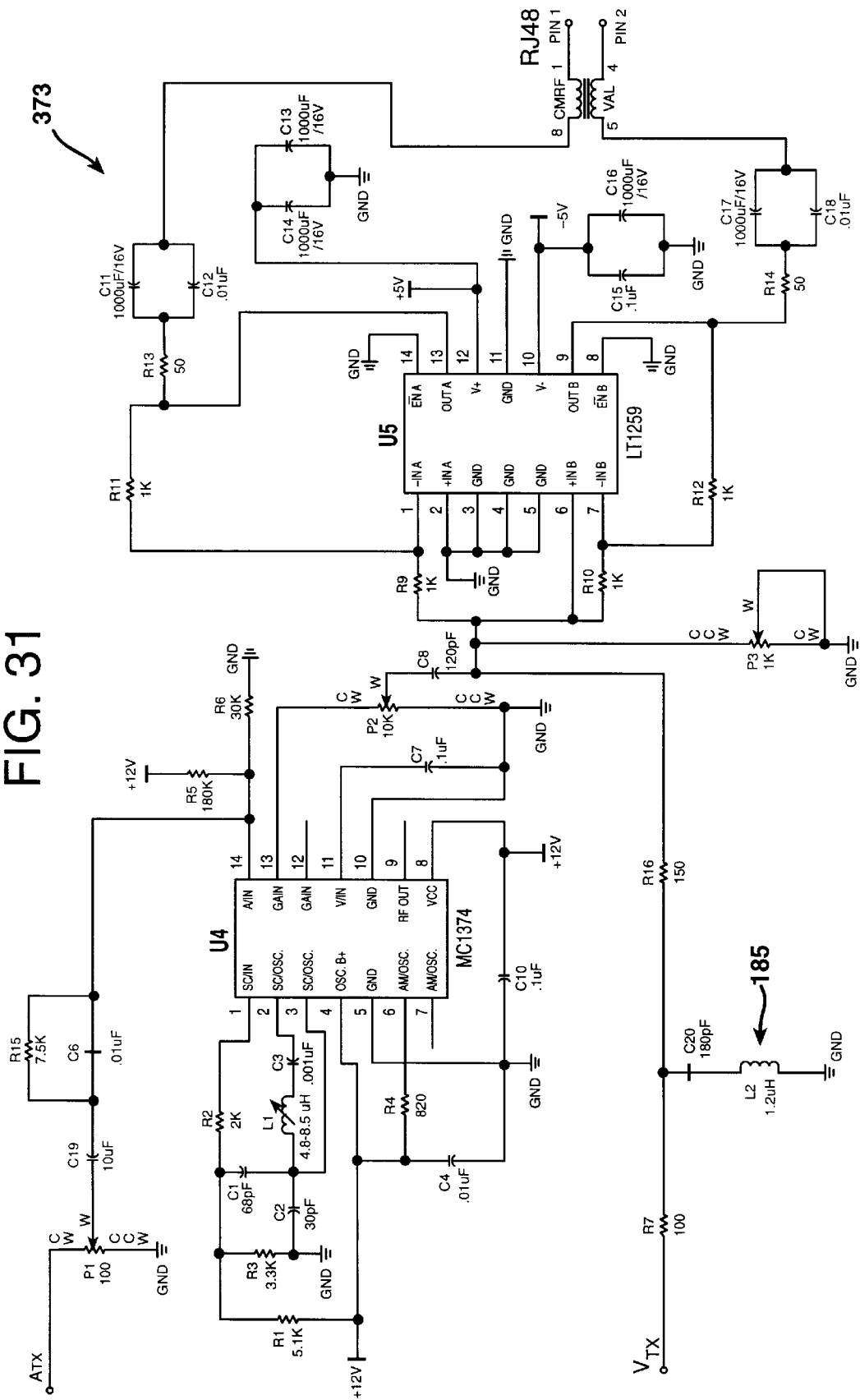
FIG. 31 is schematic diagram of the transmitter shown in FIG. 28.
Figure 32:
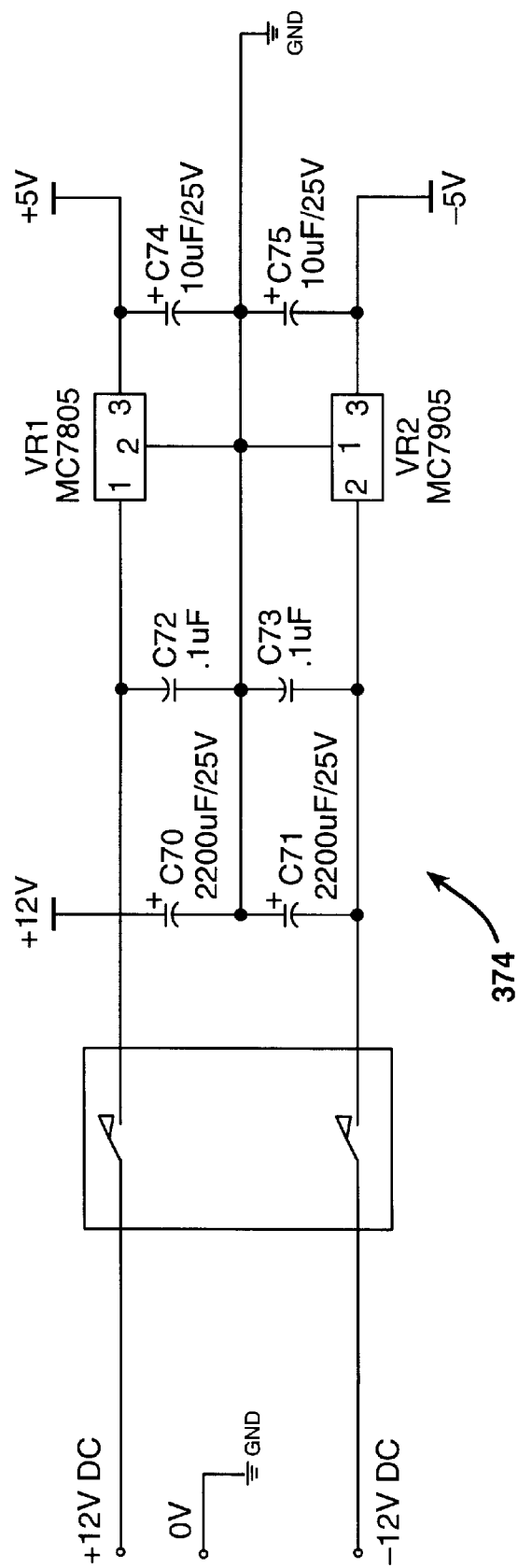
FIG. 32 is a schematic diagram of the power supply shown in FIG. 28.

A further embodiment of the invention is illustrated in FIGS. 28 through 32. The CCBV2000 is very similar to the CCBV1000 and components utilized in both bear the same reference labels. The CCBV2000 differs from the CCBV1000 in that it is operable over 2000 feet of an unshielded twisted pair. The receiver 372 of the CCBV2000 includes 3 serially connected common-mode rejection filters 177 as illustrated in FIG. 30 rather than the single common-mode rejection filter 177 employed in the CCBV1000. This triple filtering produces an even higher degree of signal purity from the signals received at pins 7 and 8 of the RJ48 jack connection 61.

Security 1000

Figure 33:
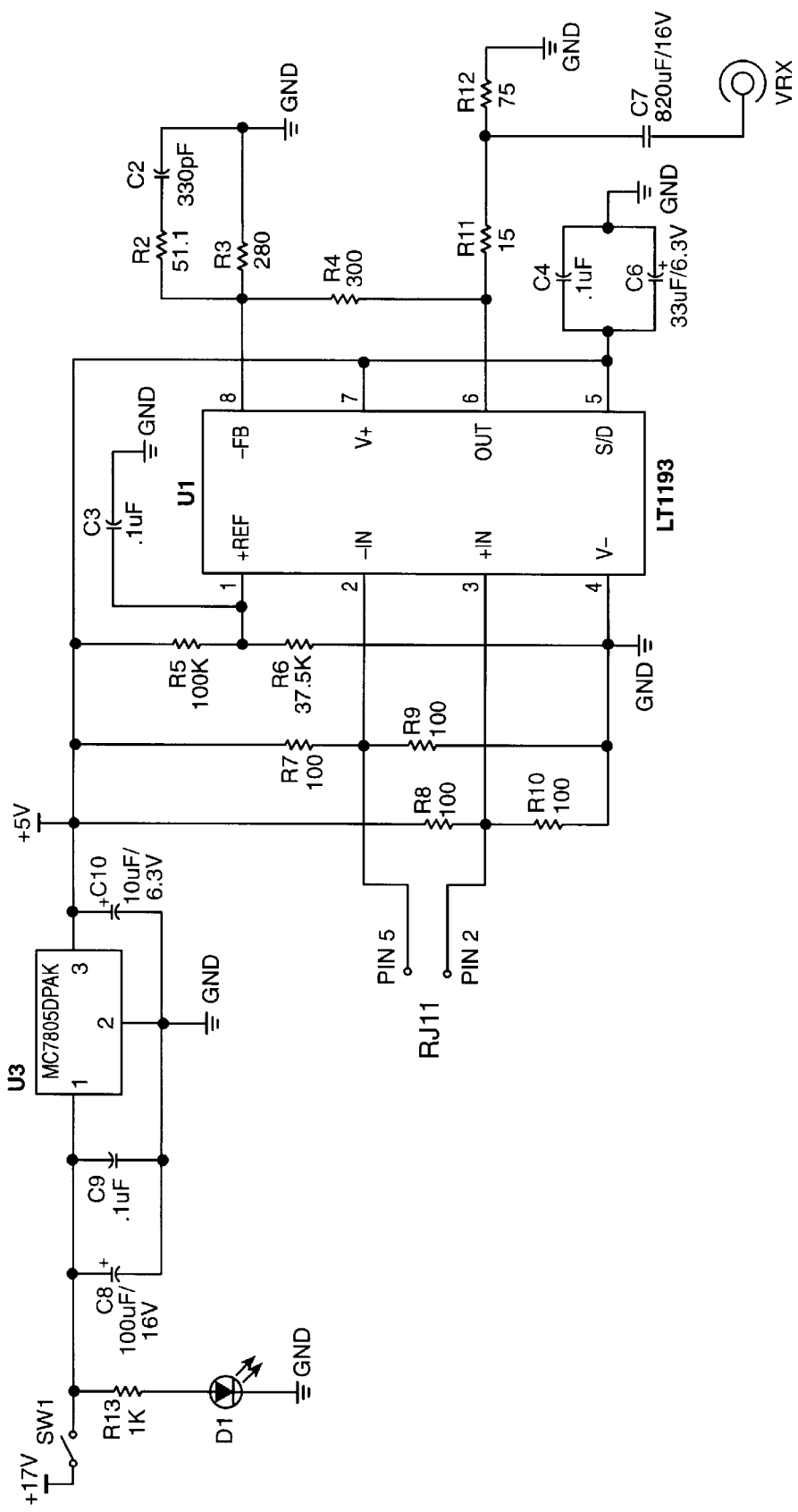
FIG. 33 is a schematic diagram of a security surveillance receiver of a video network unit according to the invention.
Figure 34:
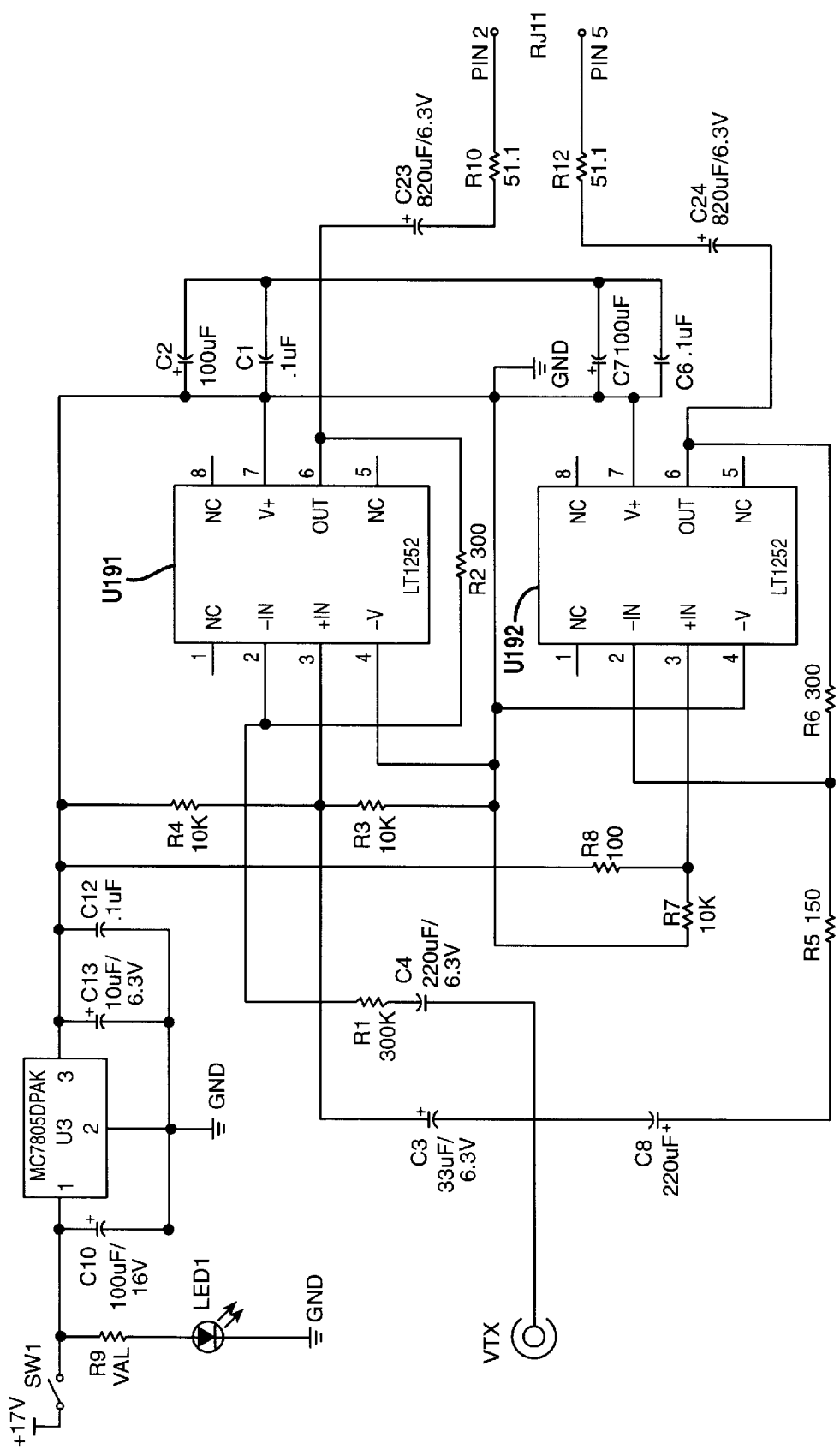
FIG. 34 is a schematic diagram of the transmitter of the video network unit of FIG. 33.

FIGS. 33 and 34 illustrate schematically a simplified station indicated as the Security 1000. The Security 1000 is a video only system and is used typically where only video surveillance is desired, so that transmission is in a single direction. The VTX signal input in FIG. 34 is a video signal from a surveillance camera. The signal VTX is a single-ended video signal. The signal from the VTX input is directed to an inverting amplifier U191 and a noninverting amplifier circuit U192. The two amplified signals are transmitted as a differential video signal through a conventional RJ11 telephone jack at pins 2 and 5 thereof.

The differential video signal is transmitted from pins 2 and 5 of the Security 1000 transmitter shown in FIG. 34 over an unloaded, twisted pair of telephone wires and appears at the receiver at pins 2 and 5 of another RJ11 telephone jack. The differential inputs are provided to a converter that produces a single-ended output at VRX.

DVN600

Figure 35:
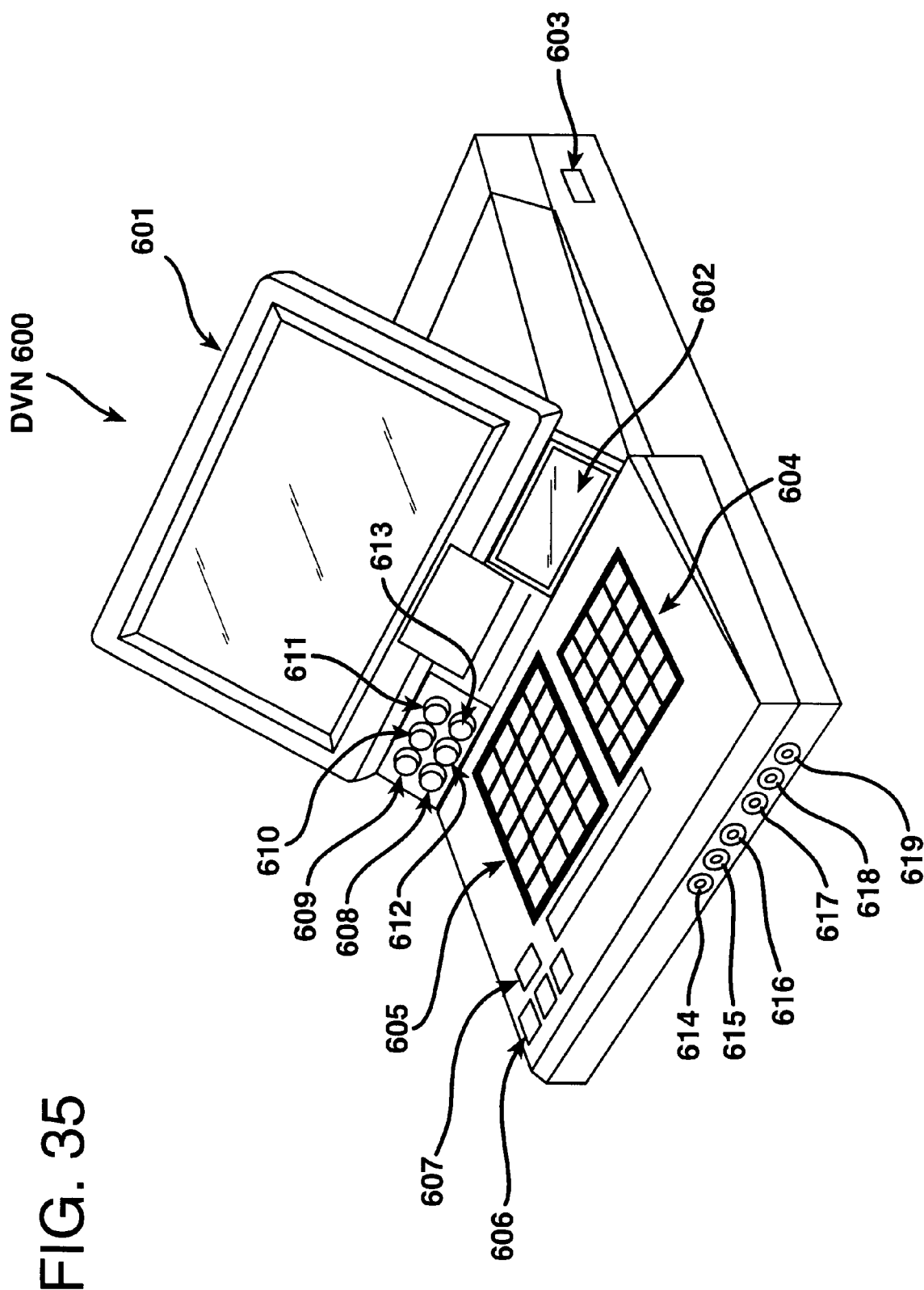
FIG. 35 is a perspective view of an alternative embodiment of a desktop video network according to the invention.

FIG. 35 illustrates a desktop unit in which a personal computer and a disktop video network are combined in a single instrument indicated as the DVN600. The DVN600 combines the features of the DVN100 in the same console as a desktop PC computer. The DVN600 employs an LCD display 601 and a status display 602. A power switch 603 controls power to the unit. The DVN600 has both a computer keyboard pad 604 and a telephone keypad 605. The system employs an audio mute key 606 and a video blank key 607.

A fault indicator LED 608 is provided to alert the user to faults may occur in the system. An auxiliary LED 609 is provided to indicate when an auxiliary source is being utilized. A transmit LED 610 is utilized to show when the video display shown is that of the station transmitting while a receive LED 611 is illuminated when the video display is from a remote station. Telephone display LED 612 indicates transmission or reception in a telephone mode, while a data LED 613 indicates a data communication in process.

The DVN600 is provided with a headset audio input 614 as well as a headset audio output 615. There is an external microphone input 616 to which a microphone may be connected. There is also an external audio output jack 617 and an external video output jack 618. Communication through the DVN600 is through the RJ48 jack connection 61 previously described.

SYSTEM ORGANIZATION

Figure 36:
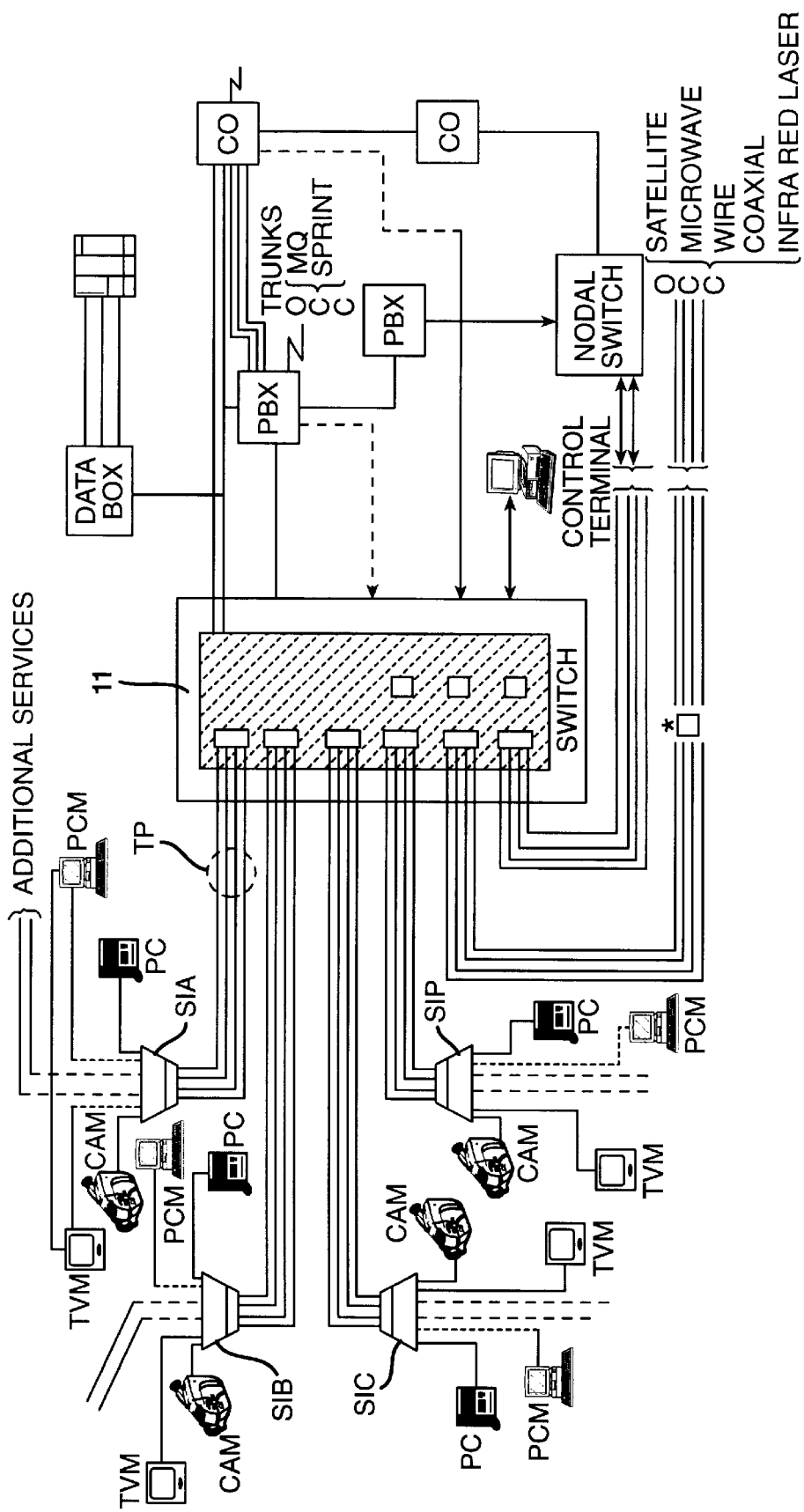
FIG. 36 is a functional block diagram representing different exemplary services that can be derived with a bandwidth of from 8 MHz to 10 MHz.

FIG. 36 illustrates an overview of a system's integrated service network of a communication network employing the cross-matrix switch 11 of the invention in a telephone company central office. The cross-matrix switch 11 located within a central office may be used to peel off the video frequency from a video signal received from remote subscribers. These video signals may alternatively be generated by either a camera CAM or a personal computer PC at a subscriber location such as the subscriber locations S1A, S1B, S1C, . . . S1P as illustrated in FIG. 36. Alternatively, the video signals may be generated by a personal computer PC at these locations. Also, each location includes some type of monitoring device, which may be a monitor PCM or a television set utilized as a monitor and indicated at TVM.

Regardless of the source of the video signal utilized at the stations S1A, S1B, S1C . . . S1P, and regardless of the monitoring equipment utilized at those stations, the video signal may be transmitted over the lengths TP to the matrix switch 11 located in a telephone company central office.

The matrix switch 11 may be used to extract the composite video and audio signal from, for example, an 8 MHz bandwidth signal. This composite video and audio signal typically occupies about 5 MHz of the 8 MHz bandwidth. Consequently, other signals may occupy the remaining portion of the bandwidth of the signal over a total of 3 MHz in this example. The matrix switch 11 may be utilized to separate the video signal and, for example, pass it to a local or remote NODAL switch as illustrated. The remaining portion of the signal may be broken up into 4 KHz increments, by filters that split the received signal up into the 4 KHz segments. These segments are quite adequate for voice frequency and data frequency communication. These 4 KHz signals segments may, for example, be directed to a PBX, a data PBX, or transmitted on to another central office CO. Alternatively, if desired, the increments of signal division may be larger, such as 8 KHz or 16 KHz. The matrix switch 11 may also transmit the entire 8 MHz, up to 10 MHz signal on through to broadband communication links, satellites, microwave, wire, coaxial cable, or infrared laser applications, as illustrated in FIG. 36.

Figure 37:
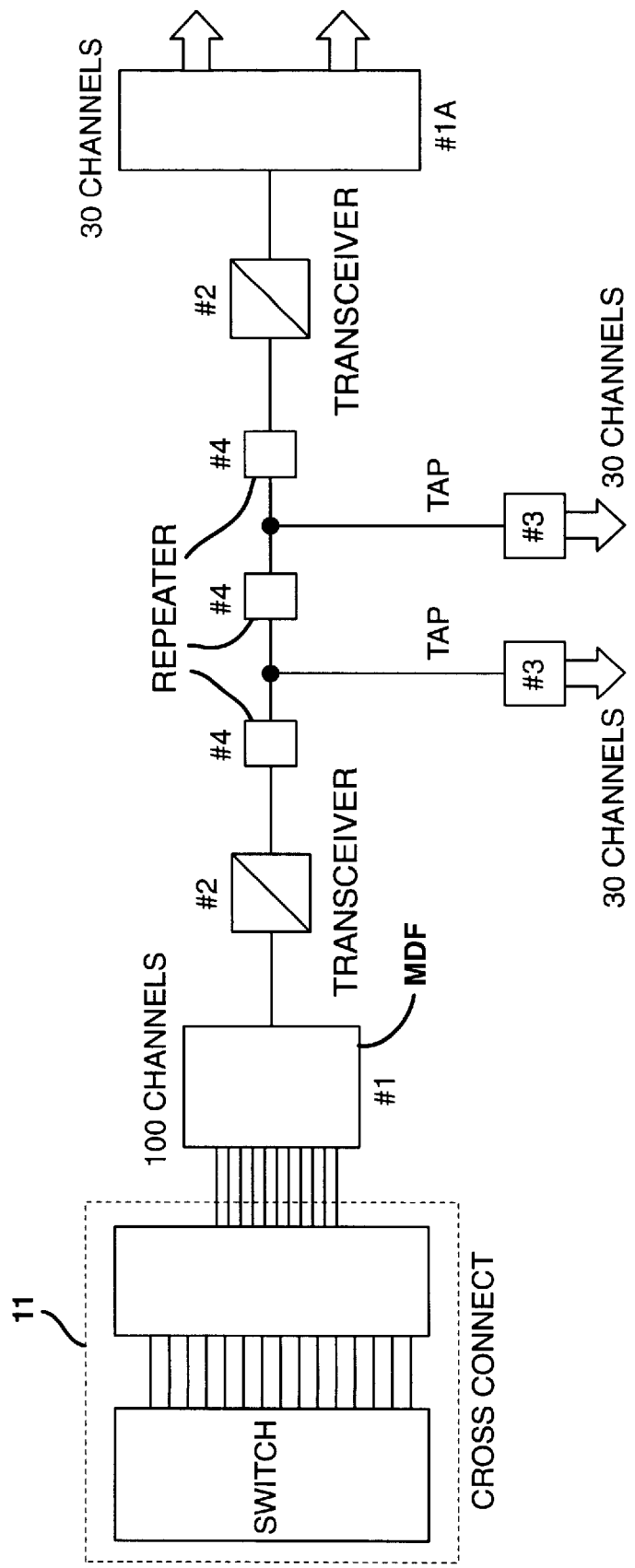
FIG. 37 is a functional block diagram representing other applications of the technology of the invention in which 100 telephone channels are derived from a signal using the video matrix switch of the invention and transmitted for a distance of 10 miles.

FIG. 37 illustrates the use of the technology of the invention in the distribution of telephone service, rather than video signals. This drawing figure illustrates the manner in which over 100 telephone channels may be transmitted over a single, unshielded, twisted pair of telephone wires for a distance of 10 miles.

FIG. 37 depicts the channel stacking capability of the system of the invention. For example, the matrix switch 11 may transmit an 8 MHz bandwidth signal on to 100 telephone wires to a main distribution frame indicated at MDF in FIG. 37. These signals are directed to a transceiver #2 and then to a repeater #4 for further transmission.

Each of the 100 channels received by the MDF may, for example, be 4 KHz in width and taken from the entire 8 MHz bandwidth output of the matrix switch 11. Once the signals have been amplified by the repeater #4, they may be distributed in various ways. For example, FIG. 37 illustrates an arrangement in which 30 of the channels are tapped for distribution by a tap #3 before being passed to a second repeater #4. Thereafter, 30 more channels are distributed to a second tap #3, while the remainder of the channels are directed to the next sequential repeater #4. These remaining channels are then directed to a transceiver #2 which in turn directs the remaining signals on to another central office indicated at #1A.

Undoubtedly, numerous variations and modifications of the invention will become readily apparent to those familiar with video transmission.

What is claimed is:

1. A video switch comprising:

a first plurality of input line terminations each having the form of a conventional, modular telephone jack that is connectable to an unshielded twisted pair of telephone wires, a separate balanced input transmission line connected to each of said input line terminations, a separate balanced-to-unbalanced, single-ended input impedance conversion circuit connected to each of said balanced input transmission lines, wherein said input impedance conversion circuits provide automatic impedance equalization for the line lengths of unshielded twisted pairs of telephone wires coupled to said input line terminations, a separate unbalanced input transmission line connected to each of said input impedance conversion circuits, a cross-matrix switch formed of an array of a second plurality less than said first plurality of single-ended, cross-matrix switching chip circuits connected to said input transmission line and coupled in parallel in pairs in which one chip circuit in each pair transmits in a forward direction and the other in each pair transmits in an opposite, reverse direction, said cross-matrix switch further including a bus interface and control logic circuit, a parallel control interface port, and a serial control interface port for connection to a computerized control system, a plurality of unbalanced output transmission lines, equal in number to said first plurality of input line terminations, connected to said cross-matrix switching chip circuits to provide separate outputs therefrom, a separate unbalanced-to-balanced impedance matching and line drive circuit connected to each of said unbalanced output transmission lines, a separate balanced output transmission line connected to each of said unbalanced-to-balanced impedance matching and line drive circuits, and separate output line terminations connected to each of said balanced output transmission lines, each of said output line terminations having the form of a conventional, modular telephone jack that is connectable to an unshielded twisted pair of telephone wires.

2. A video switch according to claim 1 wherein said single-ended input impedance conversion circuits further include means for converting positive and negative, differential mode inputs thereto from said balanced input transmission lines to single-ended, common mode outputs and said unbalanced-to-balanced impedance matching and line drive circuits further include single-ended-to differential conversion circuits for converting single-ended, common mode inputs thereto from said cross-matrix switch to positive and negative, differential mode outputs.

3. A video switch according to claim 1 wherein said input impedance compensation circuits each include means for reconstructing a received signal having a bandwidth of at least 6.0 megahertz passed through an unshielded twisted pair of telephone wires of known length and are each comprised of:

a register for electronically storing separate, predetermined attenuation ratios for a plurality of different frequencies within said bandwidth for a signal passing through said twisted pair of telephone wires of known length, and a compensating amplifier coupled to receive said received signal and said attenuation ratios and which imposes compensating, nonlinear amplification across said bandwidth of said received signal corresponding to and inversely proportional to said attenuation ratios at said corresponding different frequencies.

* * * * *